(12) United States Patent
Shigeta et al.

(10) Patent No.: US 11,823,553 B2
(45) Date of Patent: Nov. 21, 2023

(54) INFORMATION PROCESSING DEVICE, INFORMATION PROCESSING METHOD, AND INFORMATION PROCESSING SYSTEM

(71) Applicant: SONY GROUP CORPORATION, Tokyo (JP)

(72) Inventors: Osamu Shigeta, Tokyo (JP); Ryosuke Sawata, Tokyo (JP); Kiyokazu Miyazawa, Tokyo (JP); Takaaki Kato, Tokyo (JP); Yuka Ariki, Tokyo (JP); Yasufumi Hayashida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 110 days.

(21) Appl. No.: 17/598,423

(22) PCT Filed: Apr. 1, 2020

(86) PCT No.: PCT/JP2020/014994
§ 371 (c)(1),
(2) Date: Sep. 27, 2021

(87) PCT Pub. No.: WO2020/209151
PCT Pub. Date: Oct. 15, 2020

(65) Prior Publication Data
US 2022/0165147 A1     May 26, 2022

(30) Foreign Application Priority Data

Apr. 8, 2019    (JP) ................................ 2019-073724

(51) Int. Cl.
*G08B 23/00* (2006.01)
(52) U.S. Cl.
CPC ................... *G08B 23/00* (2013.01)

(58) Field of Classification Search
None
See application file for complete search history.

(56) References Cited

U.S. PATENT DOCUMENTS 6,694,916 B1 * 2/2004 Rucker ................ A01K 5/0291
                                                   222/289
7,244,166 B1 * 7/2007 Sherman .................. A63H 3/02
                                                   446/369
(Continued)

FOREIGN PATENT DOCUMENTS

| CN | 107040753 A | 8/2017 |
|----|-------------|--------|
| CN | 107725428 A | 2/2018 |

(Continued)

OTHER PUBLICATIONS

International Search Report and Written Opinion of PCT Application No. PCT/JP2020/014994, dated Jun. 23, 2020, 09 pages of ISRWO.

(Continued)

*Primary Examiner* — Muhammad Adnan
(74) *Attorney, Agent, or Firm* — CHIP LAW GROUP

(57) ABSTRACT

Provided is an information processing device that includes an acquisition unit that acquires characteristic information of an obstructer that is at least one of a person or an animal that obstructs an operation of a designated device designated in advance, and a generation unit that generates distraction-related information regarding a distraction device for distracting the obstructer and a distraction content of the distraction device according to the characteristic information, the distraction device being different from the designated device.

17 Claims, 21 Drawing Sheets

(56) References Cited

U.S. PATENT DOCUMENTS

| | | | | | |
|---|---|---|---|---|---|
| 7,703,848 | B1* | 4/2010 | Cochran | ............... | B62B 9/22 297/256.16 |
| 8,955,002 | B2* | 2/2015 | Seiden | ............. | H04N 21/47217 725/89 |
| 9,598,025 | B1* | 3/2017 | Scheppegrell | ....... | B60N 2/2845 |
| 2005/0072188 | A1* | 4/2005 | Kirsh | ............... | A44C 25/00 63/23 |
| 2007/0058039 | A1* | 3/2007 | Clark | ............... | G08B 21/0208 348/143 |
| 2007/0260765 | A1* | 11/2007 | Cooper | ............... | A63H 33/22 710/15 |
| 2008/0070215 | A1* | 3/2008 | Hunter | ............... | G09B 5/06 434/317 |
| 2009/0015799 | A1* | 1/2009 | Luciano | ............... | G03B 21/10 353/122 |
| 2011/0297104 | A1* | 12/2011 | Axelrod | ............... | A01K 15/026 119/709 |
| 2012/0272922 | A1* | 11/2012 | Axelrod | ............... | A01K 15/026 119/709 |
| 2013/0305999 | A1* | 11/2013 | Axelrod | ............... | A23K 50/42 119/710 |
| 2015/0038072 | A1* | 2/2015 | Cordier | ............... | A47D 13/06 455/39 |
| 2015/0118988 | A1* | 4/2015 | Shaw | ............... | G08B 25/10 455/404.1 |
| 2015/0302721 | A1* | 10/2015 | Schmidt | ............ | G08B 21/0461 5/93.1 |
| 2017/0079244 | A1* | 3/2017 | Mullin | ................ | A01K 15/026 |
| 2017/0108236 | A1* | 4/2017 | Guan | ................ | G05B 19/042 |
| 2017/0172109 | A1* | 6/2017 | Costello | ................ | A23K 40/25 |
| 2018/0035082 | A1* | 2/2018 | Patil | ................ | A61B 5/7278 |
| 2020/0106848 | A1* | 4/2020 | Liang | ................ | G06F 16/436 |
| 2020/0404886 | A1* | 12/2020 | Gibbs | ................ | A01K 27/009 |
| 2021/0112995 | A1* | 4/2021 | Buckley | ................ | A61M 21/02 |
| 2022/0157143 | A1* | 5/2022 | Panneer Selvam | .... | G04G 9/007 |
| 2022/0165147 | A1* | 5/2022 | Shigeta | ................ | G08B 23/00 |
| 2023/0157261 | A1* | 5/2023 | Cunha | ................ | A01K 15/02 119/719 |

FOREIGN PATENT DOCUMENTS

| | | | |
|---|---|---|---|
| CN | 108319204 | A | 7/2018 |
| JP | 2001-155274 | A | 6/2001 |
| JP | 2002196999 | A | 7/2002 |
| JP | 2006-134218 | A | 5/2006 |
| JP | 2007-072541 | A | 3/2007 |
| JP | 2007072541 | A * | 3/2007 |
| JP | 2007-334681 | A | 12/2007 |
| JP | 2017-064853 | A | 4/2017 |
| JP | 2018-197927 | A | 12/2018 |

OTHER PUBLICATIONS

D Brsci Escaping from Children's Abuse of Social Robots, Human-Robot Interaction Mar. 31, 2015 pp. 1-8.

* cited by examiner

FIG.3

| TYPE OF SENSOR UNIT | SPECIFIC EXAMPLE |
|---|---|
| CAMERA | VISIBLE LIGHT CAMERA<br>THERMOGRAPHIC CAMERA<br>DEPTH CAMERA<br>INFRARED CAMERA |
| DISTANCE SENSOR | LIDAR<br>INFRARED DISTANCE MEASUREMENT SENSOR<br>ULTRASONIC SENSOR |
| MOTION SENSOR | PIR SENSOR<br>ACCELERATION SENSOR AND GYRO SENSOR |
| MICROPHONE | MICROPHONE<br>MICROPHONE ARRAY |
| OTHERS | PRESSURE SENSOR<br>CONTACT SENSOR<br>TEMPERATURE SENSOR<br>ILLUMINANCE SENSOR<br>ENCODER<br>FLOOR DETECTION SENSOR<br>FALL PREVENTION SENSOR |

FIG.4

| MAJOR ITEM | MINOR ITEM | SPECIFIC EXAMPLE |
|---|---|---|
| STATE OF DESIGNATED DEVICE | POSITION | EDGE OF ROOM |
| | POSTURE | STANDING |
| | OBSTRUCTION SITUATION | MOVEMENT IS OBSTRUCTED OR ARM IS HELD |
| | DEGREE OF URGENCY | IN CASE WHERE DESIGNATED DEVICE IS LIKELY TO BE BROKEN OR OBSTRUCTER IS LIKELY TO BE INJURED: DEGREE OF URGENCY IS HIGH OTHERWISE: DEGREE OF URGENCY IS LOW |
| PERSON/ANIMAL CHARACTERISTIC | CLASSIFICATION | PERSON OR CAT |
| | AGE | 5 YEARS OLD |
| | ID | AAA AS FIRST DAUGHTER |
| | GENDER | FEMALE |
| | RACE | YELLOW |
| | NATIONALITY | JAPANESE OR AMERICAN |
| | HEIGHT | 106cm |
| | PHYSIQUE | SMALL |
| | HEART RATE | 100 |
| | EMOTION/EMOTIONAL MOVEMENT | CALM |
| | GAZE DIRECTION | DIRECTION OF DESIGNATED DEVICE |
| ENVIRONMENT | STRUCTURE OF ROOM | WIDTH |
| | FACILITY INFORMATION | SHOPPING MALL |
| | SURROUNDING PERSON INFORMATION | NUMBER OF SURROUNDING PEOPLE, AND ADULT/CHILD |
| | OTHERS | WEATHER, TEMPERATURE, AND PRESENCE OR ABSENCE OF STAIRCASE |

FIG.6

| TYPE OF DISTRACTION DEVICE | TYPE OF PRESENTATION | SPECIFIC EXAMPLE |
|---|---|---|
| VIDEO PRESENTATION DEVICE | VIDEO | TELEVISION<br>PROJECTOR<br>SMARTPHONE<br>MONITOR<br>LASER POINTER |
| SOUND PRESENTATION DEVICE | SOUND | SPEAKER AND DEVICE WITH SPEAKER<br>SINGING PICTURE BOOK |
| MOTION PRESENTATION DEVICE | MOTION | ROBOT<br>TOY |
| SMELL PRESENTATION DEVICE | SMELL | SMELL GENERATION DEVICE<br>FOOD SERVER |
| OTHERS | OTHERS | INTERCOM<br>ILLUMINATION |

FIG.8

| Obstructer | Attribute Information | Obstruction Situation | Distraction Device | Distraction Content | Operation of Designated Device |
|---|---|---|---|---|---|
| 3-YEAR-OLD CHILD AS FIRST DAUGHTER | POSITION, POSTURE, DEGREE OF URGENCY, CHARACTERISTIC, ENVIRONMENT, AND THE LIKE | OBSTRUCTION OF MOVEMENT | TELEVISION | REPRODUCE FAVORITE CONTENT. | ATTRACTING ATTENTION TO TV. |
| | | POKING OR HITTING | MOVING STUFFED TOY | MOVING WHILE SPEAKING. | MOVING TO EDGE OF ROOM OR HIDING UNDER DESK. |
| | | PULLING ARM | ILLUMINATION | TURNING OFF ILLUMINATION. | MOVING AWAY FROM CHILD ONCE ILLUMINATION IS TURNED OFF. |
| | | GETTING ON | SMARTPHONE OF MOTHER | VIBRATION NOTIFICATION & REPRODUCING OPENING SONG OF FAVORITE CONTENT. OUTPUTTING SCARY SOUND. | OUTPUTTING SOUND. |
| | | OBSTRUCTION OF MOVEMENT | SMART SPEAKER | CALLING CHILD WITH VOICE OF FAVORITE CHARACTER. | NOT MOVING AT ALL. |

331

FIG.9
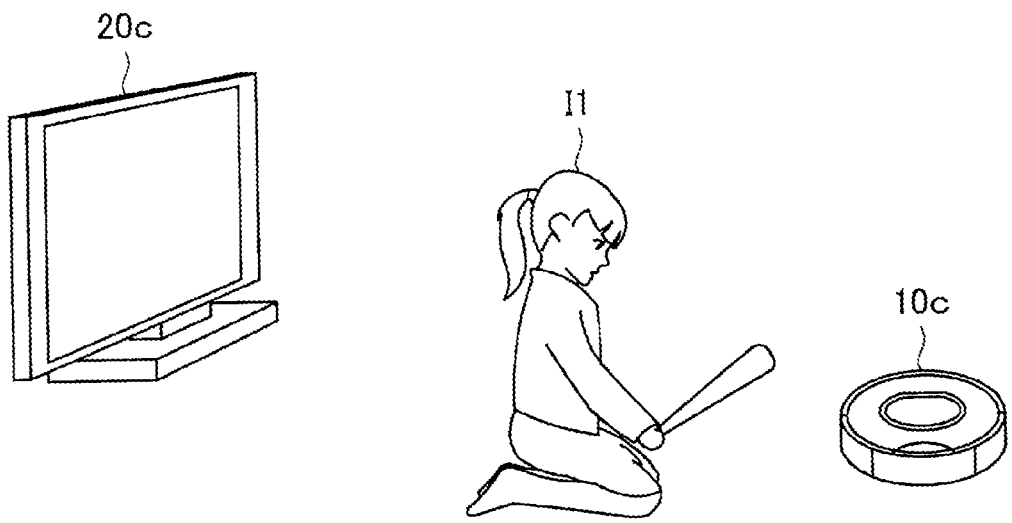
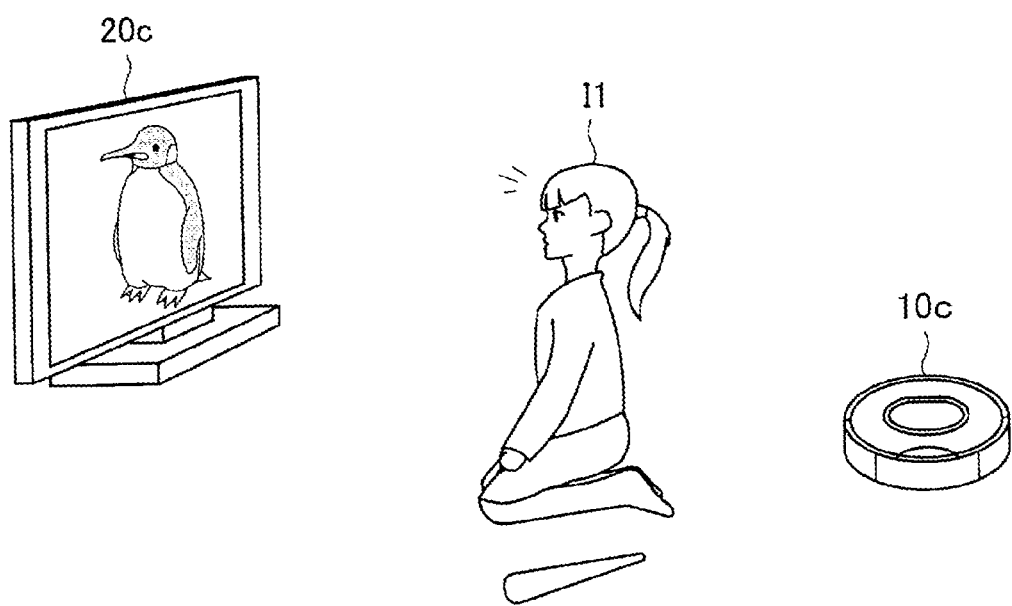

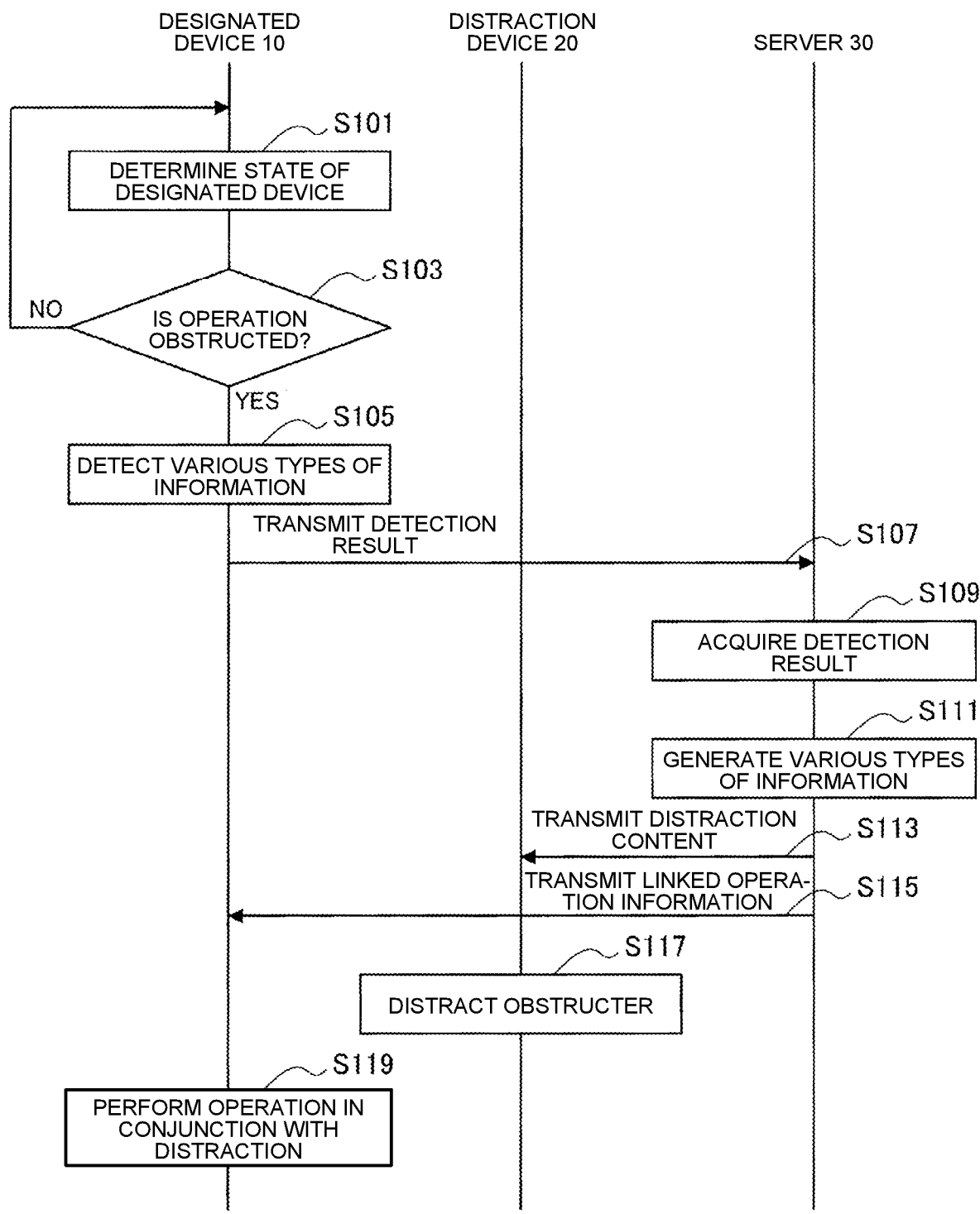

FIG.11

| OB-STRUCTER | ATTRIBUTE INFORMATION | OBSTRUCTION SITUATION | DISTRACTION DEVICE | DISTRACTION CONTENT | OPERATION OF DESIGNATED DEVICE |
|---|---|---|---|---|---|
| CHILDREN FROM MULTIPLE COUNTRIES | AGE, GENDER, NATIONALITY, OBSTRUCTION SITUATION, URGENCY POSITION, AND THE LIKE | OBSTRUCTION OF MOVEMENT | MONITOR | REPRODUCING CONTENT. | ATTRACTING ATTENTION TO MONITOR. |
| | | KICKING OR BEATING | DRIVE PROJECTOR DIRECTIONAL SPEAKER | PRESENTING CHARACTER FROM AROUND DESIGNATED DEVICE. | TEMPORARILY STOPPING. |
| | | PULLING ARM | DIRECTIONAL SPEAKER | WARNING WITH SOUND. | SHINING RED. OUTPUTTING WARNING EXPRESSION. |
| | | GETTING ON | SMARTPHONE | WARNING ON SCREEN. | SHINING RED. OUTPUTTING WARNING EXPRESSION. |
| | | ATTEMPTING TO PICK UP ARTICLE (DISH) BEING CARRIED | SECURITY ROBOT | APPROACHING AND WARNING. | MOVING IN DIRECTION IN WHICH ADULT IS PRESENT. |

| OB-STRUCTER | ATTRIBUTE INFORMATION | OBSTRUCTION SITUATION | DISTRACTION DEVICE | DISTRACTION CONTENT | OPERATION OF DESIGNATED DEVICE |
|---|---|---|---|---|---|
| CAT | IDENTIFICATION OF SUBJECT, SURROUNDING PERSON INFORMATION, OBSTRUCTION SITUATION, DEGREE OF URGENCY, POSITION, AND THE LIKE | TOUCHING ARM | PROJECTOR MOVABLE LASER POINTER MOVABLE PROJECTOR | MOVING BRIGHT SPOT. | STOPPING FOR MOMENT. |
| | | APPROACHING ARM | FOOD SERVER | MAKING SOUND AS IF FEED COMES OUT. | STOPPING FOR MOMENT. |
| | | APPROACHING ARM | SMELL PRESENTATION DEVICE | PRODUCING FAVORITE SMELL OF CAT. | FACING DISTRACTION DEVICE. |

| DANGEROUS ARTICLE | DANGEROUS ACTION |
|---|---|
| CAN OF JUICE USED AS ASHTRAY | DRINKING CONTENTS |
| UNFINISHED ALCOHOLIC BEVERAGE | DRINKING CONTENTS |
| OUTLET | INSERTING WIRE OR HAIRPIN |
| TELEVISION | CLIMBING UP AND TOPPLING TELEVISION |
| LIGHTER | HOLDING AND PLAYING |
| TELEVISION PLUG | BEING CAUGHT AND TOPPLING TELEVISION |
| PILLS | HAVING PILL CONFUSED WITH CONFECTION AND EATING IT BY MISTAKE |
| STRING HUNG ON WALL | BEING CAUGHT |
| GLASS SASH | INSERTING FINGER |
| VERANDA | FALLING |
| DRYER OR HAIR IRON | SCALDING BY TOUCHING |
| DOOR HINGE | INSERTING FINGER |
| STAIRCASE | FALLING |
| DOOR | INSERTING FINGER |
| BATHTUB | FALLING FROM HEAD |
| TILE FLOOR | SLIPPING |
| WASHING MACHINE | FALLING FROM HEAD |
| RICE COOKER | SCALDING WITH STEAM |
| CUP NOODLES | SCALDING WITH HOT WATER |
| FOOD | CHOKING |
| CHAIR | FALLING |
| CORNER OF DESK | BUMPING |
| ACORNS, BEADS, BUTTON TYPE BATTERIES | FILLING NOSE OR EAR WITH IT |
| DRAWERS OF CHEST | INSERTING FINGER |
| TOOTHBRUSH | GETTING TOOTHBRUSH STUCK IN THROAT |
| PLASTIC BAG | COVERING HEAD WITH PLASTIC BAG |

INFORMATION PROCESSING DEVICE, INFORMATION PROCESSING METHOD, AND INFORMATION PROCESSING SYSTEM

FIELD

The present disclosure relates to an information processing device, an information processing method, a program, and an information processing system.

BACKGROUND

Conventionally, robots having various functions are used in facilities such as homes and shopping malls. For example, Patent Literature 1 describes a robot that presents a content on a display included in the robot, obtains a degree of interest of a viewer according to a reaction of the viewer to the presentation, and executes the content based on the degree of interest.

CITATION LIST

Patent Literature

Patent Literature 1: JP 2017-64853 A

SUMMARY

Technical Problem

On the other hand, while the robot is operated, a surrounding child or the like may obstruct an operation performed by a device such as the robot. However, the technology described in Patent Literature 1 is not intended to suppress the obstruction of the operation of the robot.

Therefore, the present disclosure proposes a new and improved information processing device, information processing method, program, and information processing system capable of preventing an operation of a device from being obstructed by a person or an animal.

Solution to Problem

According to the present disclosure, an information processing device is provided that includes: an acquisition unit that acquires characteristic information of an obstructer that is at least one of a person or an animal that obstructs an operation of a designated device designated in advance; and a generation unit that generates distraction-related information regarding a distraction device for distracting the obstructer and a distraction content of the distraction device according to the characteristic information.

Moreover, according to the present disclosure, an information processing method performed by a processor is provided that includes: acquiring characteristic information of an obstructer that is at least one of a person or an animal that obstructs an operation of a designated device designated in advance; and generating distraction-related information regarding a distraction device for distracting the obstructer and a distraction content of the distraction device according to the characteristic information, the distraction device being different from the designated device.

Moreover, according to the present disclosure, a program is provided that causes a computer to perform: a function of acquiring characteristic information of an obstructer that is at least one of a person or an animal that obstructs an operation of a designated device designated in advance; and a function of generating distraction-related information regarding a distraction device for distracting the obstructer and a distraction content of the distraction device according to the characteristic information, the distraction device being different from the designated device.

Moreover, according to the present disclosure, an information processing system is provided that includes: a designated device that is designated in advance; an acquisition unit that acquires characteristic information of an obstructer that is at least one of a person or an animal that obstructs an operation of the designated device; a generation unit that generates distraction-related information regarding a distraction device for distracting the obstructer and a distraction content of the distraction device according to the characteristic information, the distraction device being different from the designated device; and the distraction device.

BRIEF DESCRIPTION OF DRAWINGS

FIG. 3 is a diagram illustrating a specific example of a sensor unit according to the embodiment.

FIG. 4 is a diagram illustrating a specific example of a content detected by a detection unit according to the embodiment.

FIG. 6 is a diagram illustrating a specific example of the distraction device according to the embodiment.

FIG. 8 is a diagram illustrating an example of a distraction database stored in a DB according to the embodiment.

FIG. 9 is a diagram illustrating a state in which obstruction of an operation of the designated device is suppressed by distracting an obstructer through processing performed by the information processing system according to the embodiment.

FIG. 10 is a flowchart illustrating an example of the processing performed by the information processing system according to the embodiment.

FIG. 11 is a diagram illustrating a distraction database according to a second embodiment.

FIG. 14 is a diagram illustrating a distraction database according to the third embodiment.

FIG. 20 is a view illustrating a dangerous article and a dangerous action that may be performed by a child due to the dangerous article.

DESCRIPTION OF EMBODIMENTS

Figure 1:
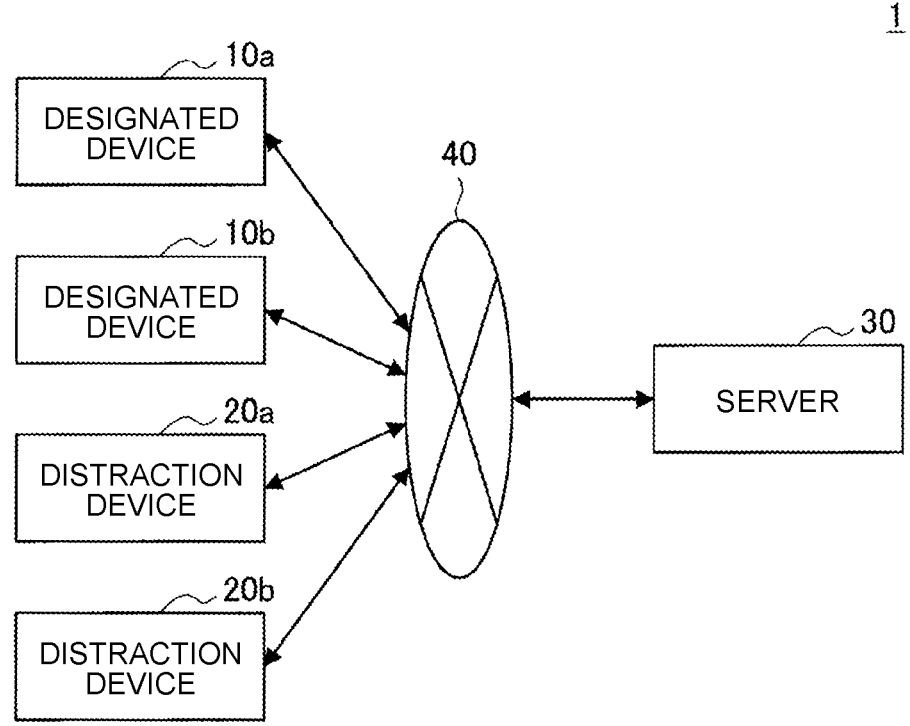
FIG. 1 is a block diagram illustrating a configuration of an information processing system according to an embodiment of the present disclosure.

Hereinafter, a preferred embodiment of the present disclosure will be described in detail with reference to the appended drawings. Note that, in the present specification and the drawings, a plurality of components having substantially the same functional configuration may be distinguished by adding different alphabets after the same reference signs. For example, a plurality of components having substantially the same functional configuration are distinguished as necessary, such as a designated device 10a and a designated device 10b. However, in a case where it is not particularly necessary to distinguish each of the plurality of components having substantially the same functional configuration, only the same reference sign is given. For example, in a case where it is not necessary to particularly distinguish the designated device 10a and the designated device 10b, they are simply referred to as the designated device 10.

Note that the description will be provided in the following order.
0. Background
1. First Embodiment
1.1. Configuration of Information Processing System
1.2. Configuration of Designated Device
1.3. Configuration of distraction device
1.4. Configuration of Server
1.5. Processing Example
1.6. Effects
1.7. Supplementary Description
2. Second Embodiment
3. Third Embodiment
4. Modified Example
4.1. Configuration of Information Processing System
4.2. Configuration of Server
4.3. Configuration of Operator Device
4.4. Processing Example
5. Application Example
5.1. Configuration of Information Processing System
5.2. Configuration of Server
5.3. Processing Example
6. Hardware Configuration
7. Supplementary Description

0. Background

First, before describing an embodiment of the present disclosure, a background that the present inventors have conceived of the technology of the present disclosure will be described.

Currently, in a space isolated from humans, such as a factory, an industrial robot substitutes for the work of humans. However, due to labor shortage and the like caused by a decrease in population in developed countries, a future in which robots that substitute for the work of humans are ubiquitous and coexist in a space where humans live is expected. In a society in which humans and robots coexist in the same space, it is considered that the operation of the robots may be obstructed by humans.

For example, in a public case, as reported in Reference Literature [1], a delivery robot that substitutes for a work of carrying a product has been experimentally operated mainly in the United States. However, a situation in which a human around the robot kicks the robot or tries to break a flag included in the robot has been reported.

Reference Literature [2] reports that when a robot is operated in a shopping mall, particularly a child kicks or hits the robot, or obstructs the movement of the robot, thereby obstructing the operation of the robot. According to the report of Reference Literature [2], the operation of the robot is objected by about five children on average for an average of four minutes, or 19 minutes in a case where the time is longer. In addition, in a case where outdoor robots become widespread in the future, it is assumed that the operation of the robots is obstructed by animals.

In addition, in a case where the cost of robots is reduced or robot technology is advanced in the future, it is considered that the spread of household robots will also advance. Currently, cleaning robots that automatically perform cleaning are widespread. However, it has been reported that the cleaning robot becomes a toy for children or pets, and the operation of the cleaning robot is obstructed. In the future, it is assumed that robots capable of performing not only movement but also physical works, such as cooking, tidying up, or folding clothes, in addition to cleaning, will become widespread. In this case, it is assumed that not only a situation in which the efficient operation of the robot is obstructed, but also a situation in which an actuation part of the robot is broken occurs.

As a prior art for dealing with the above-described situation, the delivery robot disclosed in Reference Literature [1] includes nine cameras and a plurality of sirens, and makes a threat with a warning sound output from the sirens or transmits a video to an operator who is away therefrom, thereby attempting to improve the above-described situation. However, the warning sound can cause stress for surrounding people other than the obstructer. Further, Reference Literature [1] does not mention an actual effect of the above measures. In addition, it is reported in Reference Literature [1] that no one reacts to the frequent malfunction of an anti-theft buzzer.

In Reference Literature [2], various responses to an obstruction action of children are examined. For example, it has been reported that a method of speaking to a child or the like with a strong way of speaking, a gentle way of speaking, a way of speaking appealing to emotions, or the like is performed, but the obstruction action of the child is not stopped. As an effective method, there is an action in which the robot physically pushes the child (specifically, the robot moves toward the child). However, it has been reported that the child immediately learns that the child is stronger than the robot, and the situation cannot be improved. In addition, it has been reported that the child learns that he/she can stop the robot by pushing a bumper of a safety device provided in the robot, and further obstructs the robot.

Furthermore, it has been reported that not only the structure of the surrounding environment (for example, the structure of the facility) but also the position of the surrounding child or adult is considered when planning a route on which the robot moves. Specifically, a method in which when the child approaches the robot, the robot approaches an adult or moves in a direction in which there are many people to reduce a probability of occurrence of obstruction has been reported. Such a method of reducing the probability of the occurrence of the obstruction is an effective method, but in a case where the robot is present in a place where it is difficult to escape such as a home or a small space, it is considered that the method is difficult to be implemented. In addition, a solution to a situation in which the robot is actually obstructed has not been presented.

The above reports are summarized as follows.

1. There is no way to remove the practical obstruction other than threatening means such as sirens.

In the first place, it is difficult even for an adult to stop a child or an animal having low discriminating ability from obstructing the robot.

2. There is a need to consider solutions depending on who is obstructing or a content of the obstruction.

3. In a case where the operation of the robot is easily learned by a person or an animal, obstruction cannot be continuously prevented.

As reported in Reference Literature [2], there are few prior studies for solutions to such obstruction, and there is difficulty in preventing the obstruction action by the robot itself.

On the other hand, cost reduction of a video presentation device, a sound presentation device, an actuation mechanism, or the like and technology advancement are progressing, and a future in which these devices are ubiquitous in every space of life is expected. For example, it is also conceivable that a thin monitor such as a scroll that presents an image in various spaces such a room in a house or a public facility by using a drive-type projector is used, one wall surface serves as a monitor, or a door, a mirror, a refrigerator, or a frame serves as a monitor. In addition, with the evolution of communication technologies represented by the Internet of Things (IoT), not only the video devices, sound devices, and drive devices as described above but also articles including daily necessities such as toys can be expected to communicate with various devices.

In view of the above, the present disclosure proposes a technology of suppressing obstruction by attracting the attention of an obstructer to other than a robot through information presentation or the like performed by a device present around the robot, instead of suppressing the obstruction by the robot itself that is obstructed. Furthermore, an appropriate device and information presentation content are decided according to characteristic information of a target that makes obstruction. For example, in a case where a child obstructs the operation of a cleaning robot at home, it is conceivable to present a favorite program of the child (for example, popular animation) on a television or a smartphone to turn the child's attention away from the robot.

Furthermore, in a case where a pet obstructs the operation of a kitchen robot at home, it is also conceivable to move a bright spot with a projector or a laser pointer to distract the pet. When the movement of a delivery robot is obstructed by a middle or high school student in a public place, a warning may be issued from the smartphone of the obstructer. As a result, it is possible to cope with a person (a child and an adult who has high discriminating ability) or an animal as appropriate. In addition, it is not necessary for the robot itself to deal with the obstructer. For example, since the robot itself does not need to include a display device, a sound output device, and a device for controlling these devices, cost reduction of the robot can be expected.

A prior art for attracting a user's attention includes Patent Literature 1 described above. The technology described in Patent Literature 1 is a technology of presenting a content on a display included in a robot and presenting a content in which a viewer is highly interested according to an attribute and a reaction of the viewer. However, it is considered that once a child or the like has an interest in a robot, the child clings to the robot. Therefore, it is considered that it is difficult to stop the obstruction action of the child or the like by the operation of the robot itself.

The technology of the present disclosure is fundamentally different from the technology described in Patent Literature 1 in that a suitable device is selected from devices other than the robot that is obstructed based on characteristic information of an obstructer, and the selected device presents information corresponding to the device.

(Reference Literatures)

[1] "People kicking these food delivery robots is an early insight into how cruel humans could be to robots", [online], https://www.businessinsider.jp/post-169137

[2] Takayuki Kanda, Escaping from Children's abuse of Social Robots, 2015

1. First Embodiment

Hereinafter, preferred embodiments of the present disclosure will be described with reference to the drawings as appropriate.

1.1. Configuration of Information Processing System

First, a configuration of an information processing system 1 according to an embodiment of the present disclosure will be described with reference to FIG. 1. FIG. 1 is a block diagram illustrating the configuration of the information processing system 1 according to an embodiment of the present disclosure. As illustrated in FIG. 1, the information processing system 1 according to the present embodiment includes designated devices 10*a* and 10*b*, distraction devices 20*a* and 20*b*, and a server 30. The designated devices 10, a distraction devices 20, and the server 30 are connected to each other via a network 40.

The designated device 10 is a device that performs various operations designated in advance. The designated device 10 may be, for example, a movable robot or the like. More specifically, the designated device 10 may be a robot or the like that cleans a room while moving automatically. Furthermore, the designated device 10 may be a robot or the like capable of performing various works (for example, cooking and the like) by operating an arm. Details of the configuration and function of the designated device 10 will be described later. Note that, although two designated devices 10*a* and 10*b* are illustrated in FIG. 1, the number of designated devices 10 may be one or three or more.

The distraction device 20 is a device that distracts an obstructer. The distraction device 20 may be, for example, a television, a projector, or a speaker. Details of the configuration and function of the distraction device 20 will be described later. Note that, although two distraction devices 20*a* and 20*b* are illustrated in FIG. 1, the number of distraction devices 20 may be one or three or more.

The server (information processing device) 30 has a function of acquiring characteristic information of the obstructer who obstructs an operation of the designated device 10 and causing the distraction device 20 to distract the obstructer according to the characteristic information. Details of the configuration and function of the server 30 will be described later.

The network 40 may include a public line network such as a telephone line network, the Internet, or a satellite communication network, a local area network (LAN), a wide area network (WAN), and the like. In addition, the network 40 may include a dedicated line network such as an Internet protocol-virtual private network (IP-VPN).

1.2. Configuration of Designated Device

Figure 2:
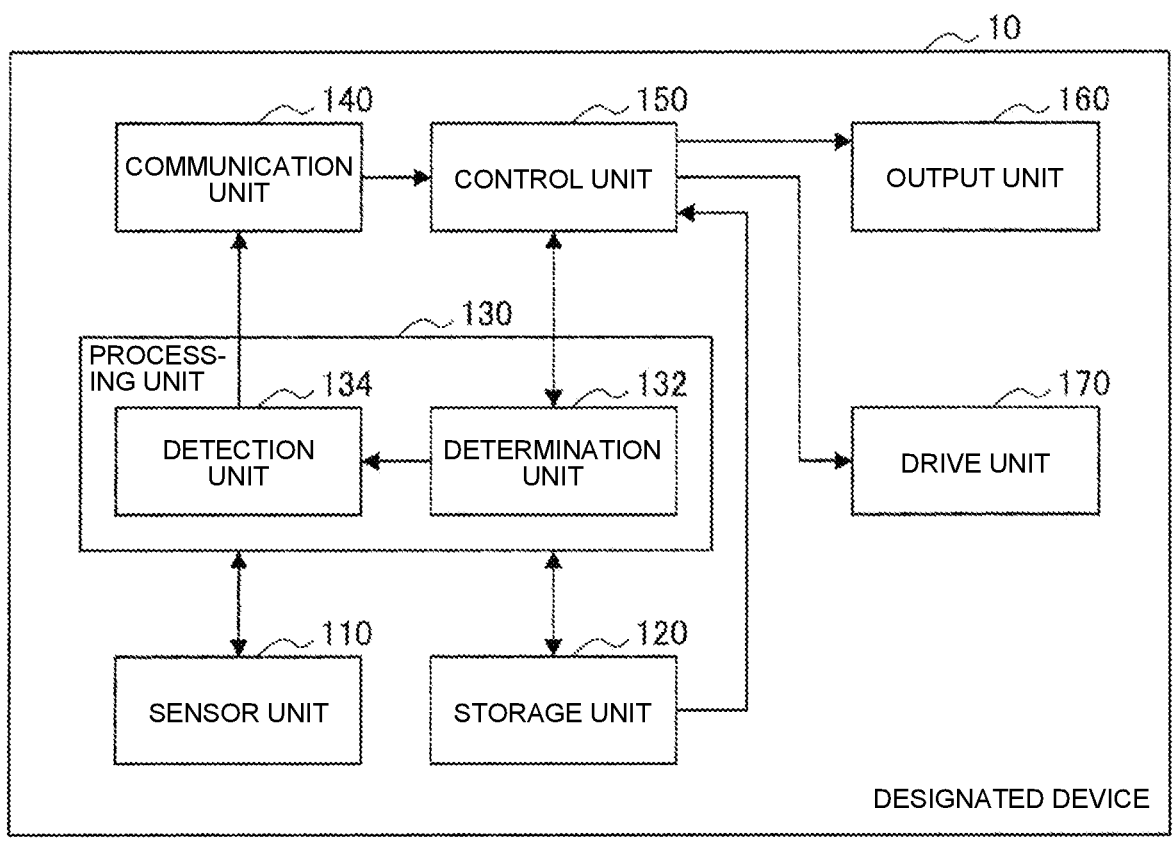
FIG. 2 is a functional block diagram illustrating a configuration of a designated device according to the embodiment.

A configuration of the designated device 10 according to an embodiment of the present disclosure will be described with reference to FIG. 2. FIG. 2 is a functional block diagram illustrating the configuration of the designated device 10 according to an embodiment of the present disclosure.

The designated device 10 has a function of performing various outputs or driving. More specifically, the designated device 10 can perform various works such as cleaning. In addition, the designated device 10 has a function of acquiring information regarding an environment around the designated device 10 and transmitting the acquired information. The functions of the designated device 10 are implemented by cooperation of a sensor unit 110, a storage unit 120, a processing unit 130, a communication unit 140, a control unit 150, an output unit 160, and a drive unit 170 included in the designated device 10. Hereinafter, the function of each functional unit included in the designated device 10 will be described.

The sensor unit 110 has a function of acquiring various types of sensor information regarding the environment around the designated device 10. The sensor unit 110 transmits the acquired sensor information to a determination unit 132 or a detection unit 134. Here, a specific example of the sensor unit 110 will be described with reference to FIG. 3. FIG. 3 is a diagram illustrating a specific example of the sensor unit 110 according to an embodiment of the present disclosure. As illustrated in FIG. 3, the sensor unit 110 may include various types of devices that acquire the sensor information, such as a camera, a distance measurement sensor, a motion sensor, or a microphone.

Specifically, the sensor unit 110 may include various known cameras such as a visible light camera, a thermographic camera, a depth camera, and an infrared camera. The sensor unit 110 acquires, for example, image information with these cameras.

Furthermore, the sensor unit 110 may include various known distance measurement sensors such as a light detection and ranging (LIDAR), an infrared distance measurement sensor, or an ultrasonic sensor. The sensor unit 110 may acquire distance information with these distance measurement sensors. Furthermore, the sensor unit 110 may include various known motion sensors such as a passive infra-red (PIR) sensor, an acceleration sensor, or a gyro sensor.

Furthermore, the sensor unit 110 may include a microphone, a microphone array, or the like. Here, the microphone array is a microphone in which a plurality of microphones are arranged and which has strong directivity in a specific direction. More specifically, the microphone array can acquire sound from a person or an animal located in a specific range. The sensor unit 110 may acquire, for example, sound information with these microphones.

Furthermore, the sensor unit 110 may include various known sensors such as a pressure sensor, a contact sensor, an illuminance sensor, an encoder, a floor detection sensor, or a fall prevention sensor. Here, the fall prevention sensor is a sensor that detects a distance between the designated device 10 and, for example, a floor surface. It is possible to suppress falling by moving the designated device 10 based on the acquired distance.

The storage unit 120 stores various types of information such as information used for processing, control, or the like in the designated device 10 or information acquired by the designated device 10. For example, the storage unit 120 may store various types of information for the processing unit 130 to perform processing and results processed by the processing unit 130. Furthermore, the storage unit 120 may store various types of information for the control unit 150 to control the output unit 160 or the drive unit 170. The information stored in the storage unit 120 is referred to by the processing unit 130 or the control unit 150 as necessary.

Furthermore, in the storage unit 120, an identification (ID) database, in which an ID assigned to a person or the like in advance is associated with various types of characteristic information such as the age, gender, or physique of the person or the like to which the ID is assigned, may be recorded. Here, the characteristic information is information indicating a characteristic of a person, an animal, or the like.

The processing unit 130 has a function of performing various types of processing based on the sensor information, the information stored in the storage unit 120, and the like. The functions of the processing unit 130 are implemented by cooperation of the determination unit 132 and the detection unit 134 included in the processing unit 130.

The determination unit 132 has a function of determining whether or not the operation of the designated device 10 is obstructed by the obstructer based on the sensor information. The determination unit 132 transmits the determination result to the detection unit 134. Here, the obstructer is at least one of a person or an animal that obstructs the operation of the designated device 10. Note that the obstructer includes a person who actually makes obstruction and a person who is likely to make obstruction. For example, the determination unit 132 may determine that the operation of the designated device 10 is obstructed when the obstructer touches or approaches the designated device 10. In addition, the determination unit 132 may determine the degree of urgency of the designated device 10.

The determination unit 132 may acquire an output state and a drive state from the control unit 150 that controls the output and the driving of the designated device 10, and determine whether or not the designated device 10 is obstructed based on these states. Specifically, the determination unit 132 may acquire information regarding the state of the operation of the designated device 10 from the control unit 150, and determine whether or not the operation of the designated device 10 is obstructed based on the information. For example, when the operation of the designated device 10 is stopped (that is, the progress of the operation is stopped) by the obstructer, the determination unit 132 may determine that the operation of the designated device 10 is obstructed.

The detection unit 134 has a function of detecting various types of information based on the sensor information. The detection unit 134 may perform detection when the determination unit 132 determines that the operation of the designated device 10 is obstructed. The detection unit 134 transmits the detection result to the communication unit 140.

A content detected by the detection unit 134 will be described with reference to FIG. 4. FIG. 4 is a diagram illustrating a specific example of the content detected by the detection unit 134. The detection unit 134 according to the present embodiment detects characteristic information regarding a characteristic of a person or an animal. Furthermore, the detection unit 134 may detect at least one of state information regarding the state of the designated device 10 or environment information regarding the environment around the designated device 10.

Here, a specific example of the state information will be described. An example of the state information may include the position (for example, an edge of a room) of the designated device 10, the posture (for example, the standing posture) of the designated device 10, an obstruction situation of the designated device 10, or the degree of urgency. The obstruction situation may be a situation in which the movement of the designated device 10 is obstructed, a situation in which the arm of the designated device 10 is held, or the like. In addition, in a case where the designated device 10 is likely to be broken or the obstructer is likely to be injured, it can be detected that the degree of urgency is high. On the other hand, when it is not such a situation where the degree of urgency is detected as being high, it can be detected that the degree of urgency is low. Furthermore, the state information may include information regarding the state of the operation of the designated device 10. For example, in a case where the arm of the designated device 10 is held, information indicating that the operation is stopped can be detected.

Furthermore, the detection unit 134 may detect action information regarding the action of the obstructer. More specifically, the detection unit 134 may detect the action of the obstructer obstructing the operation of the designated device 10. For example, the detection unit 134 may detect the action of the obstructer approaching the designated device 10 as the action information. For example, the detection unit 134 may detect the action of the obstructer touching the designated device 10 as the action information.

In addition, the detection unit 134 may detect an obstacle used for obstruction made by the obstructer. Here, the obstacle means an object that obstructs the operation of the designated device 10 and an object that is likely to obstruct the operation of the designated device 10. The obstacle can be, for example, a ball thrown by the obstructer toward the designated device 10.

Furthermore, the detection unit 134 may detect the characteristic information of a person or an animal (hereinafter, also referred to as a "person or the like") present around the designated device 10. For example, the detection unit 134 may detect the characteristic information of the person or the like by analyzing the image information acquired by the sensor unit 110 based on various known image analysis technologies. Specifically, the detection unit 134 may detect the characteristic information of items illustrated in FIG. 4.

Specifically, the characteristic information can include a classification of the person or the like (a person, a cat, or the like), an age (for example, 5 years old or the like), an ID, a gender (for example, a female or the like), a race (for example, the yellow race or the like), a nationality (for example, Japanese, American, or the like), a height (for example, 106 cm or the like), a physique (for example, small or the like), an emotion or emotional movement (for example, calm or the like), a gaze direction of the person or the like (for example, the direction of the designated device 10), and the like.

Here, the ID may be character information or the like for specifying the person or the like, and may be, for example, character information "AAA (name) as the first daughter". The detection unit 134 may detect the characteristic information of the person or the like based on the ID database stored in the storage unit 120.

The characteristic information may include information regarding a preference of the person or the like. The age is considered to be one of characteristics that greatly affect the preference of the person or the like. For example, it is considered that by showing a video of a popular animation character to a child whose age is about five, the child can be distracted. In addition, it is considered that the characteristic information other than the age, for example, information such as the gender or the nationality can also be information regarding the preference of the person or the like.

Furthermore, the detection unit 134 may detect the environment information regarding the environment around the designated device 10. For example, the detection unit 134 may detect a structure of a room in which the designated device 10 is arranged, information of a facility in which the designated device 10 is arranged, or the like. Furthermore, the detection unit 134 may detect information regarding a person other than the obstructer around the designated device 10 as the environment information. Specifically, the detection unit 134 may detect the number of persons around the designated device 10 and the age (specific numerical values or classification such as adult or child) of the person as the environment information. The detection unit 134 may detect these pieces of information based on, for example, the image information around the designated device 10. Furthermore, the detection unit 134 may detect the weather, the temperature, or the like around the designated device 10 as the environment information. Furthermore, the detection unit 134 may detect, as the environment information, the presence or absence of a staircase in the facility in which the designated device 10 is arranged. Hereinafter, the state information, the characteristic information, the environment information, the action information, and the like detected by the detection unit 134 are also collectively referred to as attribute information.

The communication unit 140 has a function of transmitting and receiving various types of information. For example, the communication unit 140 may transmit the detection result (the characteristic information, the environment information, the state information, the action information, or the like) of the detection unit 134 to the server 30 via the network 40. Furthermore, the communication unit 140 may receive various types of information generated by the server 30.

The control unit 150 has a function of controlling the output of the output unit 160 and the driving of the drive unit 170 included in the designated device 10. The control unit 150 transmits the output situation of the output unit 160 or the driving situation of the drive unit 170 to the determination unit 132 as necessary.

The output unit 160 has a function of performing various outputs. The output unit 160 may be, for example, various known sound output devices that output sound or various known image output devices that output an image.

The drive unit 170 is a device that performs various types of driving. The drive unit 170 may be, for example, a robot arm imitating a hand. A finger or the like of the robot arm can be driven under the control of the control unit 150. Furthermore, the drive unit 170 may be a foot including, for example, a tire for the designated device 10 to move. The designated device 10 may move in a manner in which the direction or rotation speed of the tire is controlled by the control unit 150.

1.3. Configuration of Distraction Device

Figure 5:
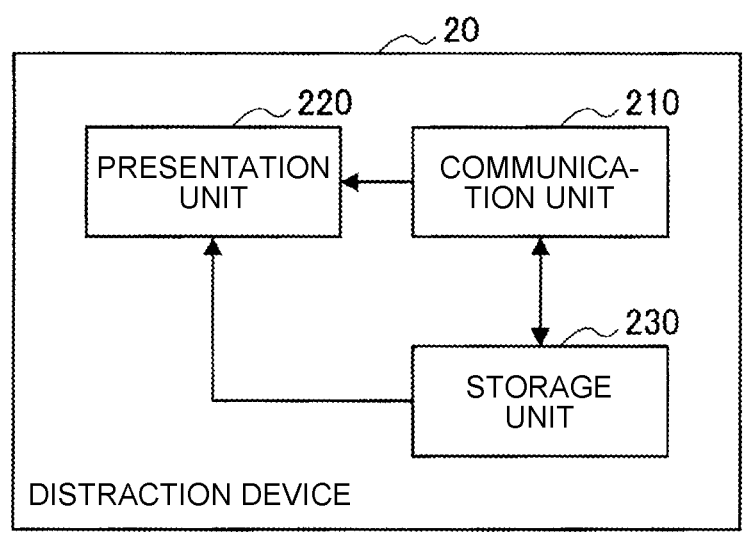
FIG. 5 is a functional block diagram illustrating a configuration of a distraction device according to the embodiment.

Next, a configuration of the distraction device 20 according to an embodiment of the present disclosure will be described with reference to FIG. 5. FIG. 5 is a functional block diagram illustrating the configuration of the distraction device 20 according to an embodiment of the present disclosure.

The distraction device 20 has a function of performing various types of distractions according to various type of information transmitted from the server 30. The functions of the distraction device 20 according to the present embodiment are implemented by cooperation of a communication unit 210, a presentation unit 220, and a storage unit 230 included in the distraction device 20.

Here, a specific example of the distraction device 20 will be described with reference to FIG. 6. FIG. 6 is a diagram illustrating the specific example of the distraction device 20. As illustrated in FIG. 6, examples of the type of the distraction device 20 can include a video presentation device, a sound presentation device, a motion presentation device, a smell presentation device, and the like.

The video presentation device is one of various known devices capable of presenting a video. Specifically, the video presentation device may be a television, a projector, a smartphone, a monitor, a laser projector, or the like. Here, the projector may be a projector in which a direction in which a video is projected is fixed, or may be a drive-type projector capable of changing a direction in which a video is projected. Furthermore, the projector may be a projector using a mercury lamp as a light source, or may be a laser projector using an LED or the like as a light source. The type of the monitor is not particularly limited, but may be, for example, a door monitor provided on a door.

The sound presentation device is one of various known devices capable of presenting a sound. Specifically, the sound presentation device may be a speaker or a device which has various functions (for example, an illumination function or the like) and on which a speaker is mounted. Furthermore, the sound presentation device may be a singing picture book capable of presenting a picture and presenting a song. Furthermore, the speaker may be a directional speaker capable of selectively outputting a sound in a specific range.

The motion presentation device is one of various devices capable of presenting a motion. Specifically, the motion presentation device may be a robot, a driven toy, or the like. The motion presentation devices may be capable of presenting not only a motion but also a sound.

The smell presentation device is one of various devices capable of presenting a smell. Specifically, the smell presentation device may be a smell generation device capable of generating a smell. Furthermore, the smell presentation device may be a food server that presents a smell of food by providing food.

The present disclosure is not limited thereto, and the distraction device 20 may be a device such as an intercom or an illumination.

The communication unit 210 has a function of transmitting and receiving various types of information. For example, the communication unit 210 receives a distraction content from the server 30 via the network 40, and transmits the distraction content to the presentation unit 220.

The presentation unit 220 has a function of performing various types of presentation based on the distraction content transmitted from the server 30. For example, in a case where the distraction device 20 is the video presentation device, the presentation unit 220 presents a video, and in a case where the distraction device 20 is the sound presentation device, the presentation unit 220 presents a sound. Furthermore, in a case where the distraction device 20 is the motion presentation device, the presentation unit 220 presents a motion. Furthermore, in a case where the distraction device 20 is the smell presentation device, the presentation unit 220 presents a smell by emitting, for example, a specific perfume or the like. For example, the smell presentation device may present a smell of a foxtail. Furthermore, the smell presentation device may present a smell and present a sound.

The storage unit 230 has a function of storing various types of information. The storage unit 230 may store, for example, the distraction content received by the communication unit 210. Furthermore, the storage unit 230 may store information for the presentation unit 220 to perform various types of presentation.

1.4. Configuration of Server

Figure 7:
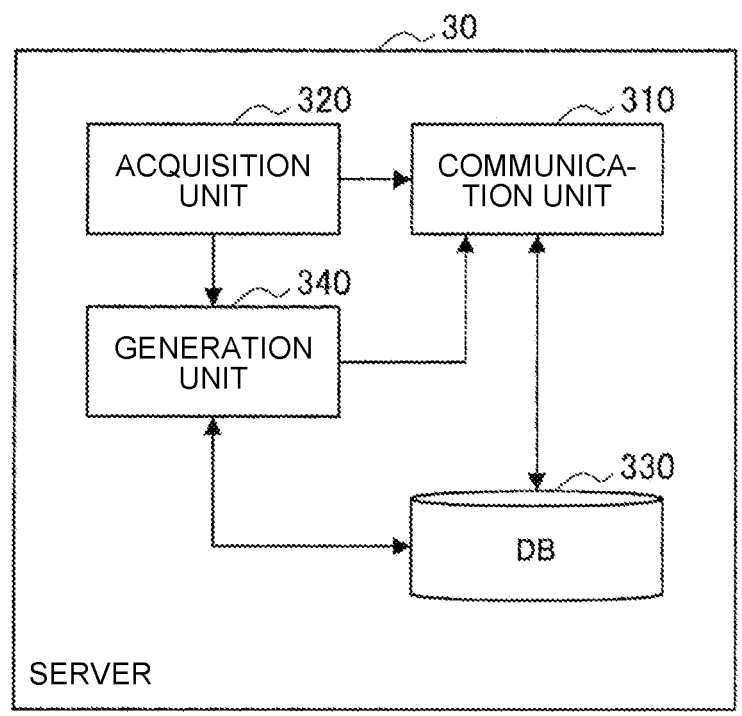
FIG. 7 is a functional block diagram illustrating a configuration of a server according to the embodiment.

Next, a configuration of the server 30 according to an embodiment of the present disclosure will be described with reference to FIG. 7. FIG. 7 is a functional block diagram illustrating the configuration of the server 30 according to an embodiment of the present disclosure.

The server 30 functions as the information processing device. That is, the server 30 has a function of acquiring the characteristic information of the obstructer that obstructs the operation of the designated device 10. Furthermore, the server 30 has a function of generating distraction-related information regarding the distraction device 20 for distracting the obstructer and the distraction content of the distraction device 20 according to the acquired characteristic information. The functions of the server 30 are implemented by cooperation of a communication unit 310, an acquisition unit 320, a database (DB) 330, and a generation unit 340 included in the server 30.

The communication unit 310 has a function of transmitting and receiving various types of information. For example, the communication unit 310 may receive the detection result (the attribute information such as the characteristic information, the environment information, the state information, or the action information) of the detection unit 134 from the designated device 10 and transmit the detection result to the acquisition unit 320. Furthermore, the communication unit 310 may transmit the information generated by the generation unit 340 to the designated device 10 or the distraction device 20 via the network 40.

The acquisition unit 320 has a function of acquiring various types of information. Specifically, the acquisition unit 320 acquires various types of information such as the attribute information received by the communication unit 310. The acquisition unit 320 transmits the acquired information to the generation unit 340.

The DB 330 stores various types of information. The DB 330 stores, for example, a distraction database that associates the attribute information, the obstruction situation, and the distraction-related information. FIG. 8 is a diagram illustrating an example of a distraction database 331 stored in the DB 330. In the present embodiment, the distraction database 331 for a 3-year-old child as the first daughter will be described. In the distraction database 331, the attribute information (except for the obstruction situation), the obstruction situation, the distraction device 20, the distraction content of the distraction device 20, and the operation of the designated device 10 are recorded in association with each other. More specifically, the distraction device 20, the distraction content, and the operation of the designated device 10 are designated for each obstruction situation. Therefore, when the attribute information and the obstruction information are specified, the distraction device 20, the distraction content, and the operation of the designated device 10 are specified. Note that the distraction database 331 illustrated in FIG. 8 has a table format, but the format of the distraction database 331 is not limited to the table format.

Furthermore, the DB 330 may store a history of distraction performed by the distraction device 20. For example, the DB 330 may store, as the distraction history, the distraction device 20 that has performed the distraction, the distraction content, a time when the distraction has been performed, and the like in association with each other. Furthermore, the DB 330 may store a list of the designated devices 10 and the distraction devices 20 designated in advance. The distraction device 20 that performs the distraction can be designated based on the list. Furthermore, the DB 330 may store registered user information. The user information may include, for example, the characteristic information such as the information regarding the preference of the user. Furthermore, the DB 330 may store preference information or the like for each age group of the user.

The generation unit 340 has a function of generating various types of information based on the information transmitted from the acquisition unit 320 or the information recorded in the DB 330. The generation unit 340 has a function of generating the distraction-related information regarding the distraction device 20 and the distraction content according to the characteristic information, for example.

More specifically, the generation unit 340 can generate the distraction-related information based on the characteristic information and the distraction database 331 illustrated in FIG. 8. In a case where the obstructer obstructs the movement of the designated device 10, for example, the generation unit 340 may generate the distraction-related information indicating that the distraction device 20 is a television and the distraction content is reproducing a video that the obstructer likes. Furthermore, the generation unit 340 may generate linked operation information for causing the designated device 10 to be operated in conjunction with the distraction performed by the distraction device 20. The linked operation information can be, for example, information for causing the designated device 10 to perform an operation for attracting the attention of the obstructer to the distraction device 20 (that is, the television). For example, the linked operation information may be information for causing the designated device 10 to output a sound such as "Oh, there is XXX". Here, XXX may be a character or the like displayed on the distraction device 20. At this time, the generation unit 340 may generate the linked operation information for attracting the attention of the obstructer to the distraction device 20 by using a light emitting diode (LED), a face orientation, dancing, a sound, or the like of the designated device 10.

In addition, in a case where the obstructer is performing the obstruction action such as poking or hitting the designated device 10, the generation unit 340 may generate the distraction-related information indicating that the distraction device 20 is a moving stuffed toy and the distraction content is a content in which the moving stuffed toy moves while speaking. In this case, the generation unit 340 may generate the linked operation information for causing the designated device 10 to perform an operation such as moving to an edge of a room or hiding under a desk.

In addition, in a case where the obstructer is performing the obstruction action of pulling the arm of the designated device 10, the generation unit 340 may generate the distraction-related information indicating that the distraction device 20 is an illumination and the distraction content is an operation of turning off the illumination. At this time, the generation unit 340 may generate the linked operation information for causing the designated device 10 to perform an operation of quickly moving away from the child when the illumination is turned off.

In addition, in a case where the obstructer gets on the designated device 10, the generation unit 340 may generate the distraction-related information indicating that the distraction device 20 is a smartphone of the mother of the obstructer, and the distraction content is vibrating the smartphone and reproducing an opening song of a content (for example, popular animation) that the obstructer likes. In this case, the generation unit 340 may generate the linked operation information for causing the designated device 10 to output a sound (for example, "This is a call for XXX (the name of the obstructer)") in conjunction with the distraction performed by the distraction device 20.

In addition, in a case where the obstructer obstructs the movement of the designated device 10, the generation unit 340 may generate the distraction-related information indicating that the distraction device 20 is a smart speaker and the distraction content is outputting a sound calling the obstructer through the smart speaker, the sound being a voice of a favorite character of the obstructer. The sound may be, for example, a voice saying, "XXX (the name of the obstructer), let's hang out". Furthermore, the generation unit 340 may generate the linked operation information for causing the designated device 10 to not move at all (for example, pretend to be dead).

1.5. Processing Example

Next, processing performed by the information processing system 1 according to an embodiment of the present disclosure will be described with reference to FIGS. 9 and 10. FIG. 9 is a diagram illustrating a state in which obstruction of an operation of a designated device 10c is suppressed by distracting an obstructer I1 through the processing performed the information processing system 1. Furthermore, FIG. 10 is a flowchart illustrating an example of the processing performed by the information processing system 1 according to an embodiment of the present disclosure.

Here, as illustrated in the upper part of FIG. 9, it is assumed that the obstructer I1 intends to obstruct the operation of the designated device 10c. A place illustrated in FIG. 9 is assumed to be, for example, a living room in a home. In addition, a distraction device (television) 20c is arranged behind the obstructer I1. Here, it is assumed that the obstructer I1 is a 5-year-old child as the first daughter, and the designated device 10c is a cleaning robot. It is assumed that the mother of the obstructer I1 is washing clothes, and there is no person other than the obstructer I1 around the designated device 10c.

Hereinafter, the processing performed by the information processing system 1 will be described with reference to the flowchart illustrated in FIG. 10.

First, the determination unit 132 included in the designated device 10c determines the state of the designated device 10c (Step S101). More specifically, the determination unit 132 determines the state of the designated device 10c based on the sensor information acquired by the sensor unit 110 (not illustrated in FIG. 9) included in the designated device 10c.

When the determination unit 132 determines that the operation of the designated device 10c is obstructed (Step S103: YES), the processing proceeds to Step S105. For example, in a case where the designated device 10c is hit by the obstructer I1, the determination unit 132 may determine that the operation of the designated device 10c is obstructed. On the other hand, in a case where the determination unit 132 determines that the operation of the designated device 10c is not obstructed (Step S103: NO), the processing returns to Step S101.

In a case where the determination unit 132 determines that the operation of the designated device 10c is obstructed (Step S103: YES), the detection unit 134 detects various types of information based on the sensor information (Step S105). For example, the detection unit 134 detects information of the items illustrated in FIG. 4. More specifically, the detection unit 134 detects various types of information such as the characteristic information, the state information, the environment information, or the action information based on the sensor information. Note that, in the present embodiment, the detection unit 134 can identify the obstructer. For example, the detection unit 134 can detect an ID of the obstructer I1 and acquire various types of characteristic information of the obstructer I1 based on the ID and the ID database. The detection unit 134 transmits the detection result to the communication unit 140.

Next, the communication unit 140 transmits the detection result of the detection unit 134 to the server 30 (Step S107). The communication unit 310 included in the server 30 receives the detection result.

Next, the acquisition unit 320 acquires the detection result from the communication unit 310 (Step S109). More specifically, the acquisition unit 320 acquires the detection result such as the characteristic information, the environment information, the state information, or the action information. The acquisition unit 320 transmits the acquired detection result to the generation unit 340.

Next, the generation unit 340 generates various types of information (Step S111). More specifically, the generation unit 340 generates the distraction-related information and the linked operation information based on the detection result such as the characteristic information. For example, the generation unit 340 may generate the distraction-related information indicating that the distraction device 20 is a television, and the distraction content is presenting a video and a sound of a favorite animation of the obstructer I1. In addition, the generation unit 340 may generate the linked operation information for causing the designated device 10c to perform an operation of moving away from the obstructer I1 in conjunction with the distraction performed by the distraction device 20c. The generation unit 340 transmits the generated distraction-related information and linked operation information to the communication unit 310.

Here, in a case where the obstruction situation is the obstruction of the movement, and there is no particular urgency for the designated device 10c or the obstructer I1 (that is, the degree of urgency is low), the generation unit 340 may generate the distraction-related information for reproducing a short content (for example, an advertisement of a favorite content) by, for example, the distraction device 20c to distract the obstructer I1.

In addition, the tendency of the obstructer I1 to continuously obstruct the operation of the designated device 10c again after the end of the advertisement, or the tendency of the obstructer I1 to pay attention to the designated device 10c again even when the obstructer I1 is distracted from the designated device 10c for a moment may be known based on the log of the reaction for a long period of time. In this case, the generation unit 340 may extend a time for which the distraction device 20c reproduces the content. In addition, in a case where the distraction device 20 is a smartphone, the generation unit 340 may cause the smartphone to present a content such as a game to continue to distract the obstructer I1.

In addition, the generation unit 340 may randomly designate the distraction device 20c and the distraction content, such that the obstructer I1 cannot easily learn the distraction content. In addition, the generation unit 340 may designate the distraction device 20 from among the distraction devices 20 illustrated in FIG. 6, or may cooperate with a television in a different room to cause the television to perform the distraction. In a case where the attention of the obstructer I1 is attracted to the television only by a sound without a video, a voice of a favorite character of the obstructer I1 may be used to present a sound (for example, "I'm YYY (the name of the favorite character). Let's hang out together."). Note that the designation of the content based on the preference of the child may be automatically performed by using various types of statistical data.

In a case where the degree of urgency of the designated device 10c is high (for example, in a case where there is a possibility that the designated device 10c is broken) or in a case where the degree of urgency of the obstructer I1 is high (for example, there is a possibility that the obstructer I1 is injured), the generation unit 340 may designate the distraction device 20 and the distraction content according to each situation. For example, as described with reference to FIG. 8, the generation unit 340 may generate the distraction-related information for causing the smartphone of the mother, which is the distraction device 20, to distract the obstructer I1 and output a video and a sound that frighten the obstructer I1. Furthermore, the generation unit 340 may generate the distraction-related information for causing the distraction device 20 to output a sound saying, "Don't do oo", the sound being a voice of the favorite character or a family member of the obstructer I1.

In addition, the generation unit 340 may generate a plurality of candidates of the distraction-related information and select the distraction-related information to be actually transmitted to the distraction device 20 from the plurality of generated candidates of the distraction-related information.

Next, the communication unit 310 transmits the distraction content to the designated distraction device 20c (Step S113). The communication unit 210 included in the distraction device 20c receives the distraction content.

Next, the communication unit 310 transmits the linked operation information to the designated device 10c (Step S115). The communication unit 140 included in the designated device 10c receives the linked operation information.

Next, the distraction device 20c distracts the obstructer (Step S117). More specifically, the presentation unit 220 included in the distraction device 20c performs various types of presentation according to the distraction-related information. For example, the presentation unit 220 presents a favorite video and a favorite sound of the obstructer I1. For example, the distraction device 20c presents a video of an animal that the obstructer I1 likes (see the lower part of FIG. 9). As a result, the attention of the obstructer I1 is attracted to the distraction device 20c, and the obstruction made by the obstructer I1 is suppressed.

Next, the designated device 10c performs an operation that is in conjunction with the distraction of the distraction device 20c based on the linked operation information (Step S119). For example, the control unit 150 included in the designated device 10 controls the driving of the drive unit 170 based on the linked operation information. For example, the control unit 150 controls the driving of the drive unit 170

(here, a tire which is a foot of the designated device 10c) to move the designated device 10c away from the obstructer I1. Accordingly, the obstruction of the operation of the designated device 10c is further suppressed.

Hereinabove, the processing performed by the information processing system 1 according to an embodiment of the present disclosure has been described.

1.6. Effects

Effects of the processing performed by the server 30 or the information processing system 1 according to the first embodiment will be described. The server 30 according to the first embodiment acquires the characteristic information of the obstructer I1 that obstructs the operation of the designated device 10c (Step S109), and generates the distraction-related information regarding the distraction device 20c and the distraction content according to the characteristic information (Step S111). The distraction device 20c distracts the obstructer I1 based on the distraction-related information, whereby the obstruction of the operation of the designated device 10c by the obstructer is suppressed. As a result, the designated device 10 can perform work efficiently.

Furthermore, with the information processing system 1 according to the present embodiment, since the designated device 10 does not need to include a device (for example, the sound output device, the video output device, or the like included in the distraction device 20) for suppressing the obstruction made by the obstructer, the cost of the designated device 10 is reduced.

Furthermore, according to the processing performed by the information processing system 1 according to the present embodiment, it is also possible to cause the obstructer to stop the action of damaging the designated device 10 or to suppress the action in advance. Therefore, the damage to the designated device 10 is suppressed.

Furthermore, the characteristic information may include information regarding the preference of the obstructer I1. As a result, the server 30 can designate the distraction device 20 and the distraction content according to the preference of the obstructer I1. As a result, the server 30 can generate the distraction-related information capable of further suppressing the obstruction of the operation of the designated device 10 that is made by the obstructer I1.

In addition, the characteristic information may include information regarding the age of the obstructer I1. Generally, a subject in which a person is interested varies depending on the age. Therefore, as the generation unit 340 generates the distraction-related information according to the age of the obstructer I1, it is possible to attract an attention to the distraction device 20 according to the interest of the obstructer or the like, such that it is possible to further suppress the obstruction of the operation of the designated device 10 made by the obstructer.

Furthermore, in the above-described embodiment, the generation unit 340 can generate the distraction-related information according to the environment around the designated device 10. Therefore, since the generation unit 340 can designate the distraction device 20 and the distraction content suitable for the environment around the designated device 10, the obstruction made by the obstructer is more effectively suppressed.

Furthermore, the generation unit 340 according to the present embodiment can generate the distraction-related information according to information regarding a person around the designated device 10. For example, in a case where there is a person other than the obstructer I1 around the designated device 10, the distraction-related information for presenting a sound that can be heard only by the obstructer I1 can be generated. Therefore, with the information processing system 1 according to the present embodiment, it is possible to distract the obstructer I1 without giving stress to surrounding people other than the obstructer I1.

In addition, the generation unit 340 according to the present embodiment can generate the linked operation information for causing the designated device 10 to be operated in conjunction with the distraction performed by the distraction device 20. Therefore, the designated device 10 according to the present embodiment can further suppress the obstruction made by the obstructer by performing an operation of, for example, moving away from the obstructer I1 in conjunction with the distraction performed by the distraction device 20.

Furthermore, the generation unit 340 according to the present embodiment can generate the distraction-related information based on the state information of the designated device 10. Therefore, since the generation unit 340 can designate the distraction device 20 and the distraction content according to the state of the designated device 10, it is possible to more effectively suppress the obstruction made by the obstructer. For example, in a case where the degree of urgency of the designated device 10 is high, the generation unit 340 can generate the distraction-related information for more strongly suppressing the obstruction made by the obstructer.

In addition, the state information may include information regarding the state of the operation of the designated device 10. Therefore, the generation unit 340 according to the present embodiment can designate the distraction device 20 and the distraction content so that the operation of the designated device 10 smoothly proceeds according to the state of the operation of the designated device 10.

In addition, the generation unit 340 according to the present embodiment can generate the distraction-related information based on the information regarding the action of the obstructer I1. Therefore, the generation unit 340 can designate the distraction device 20 and the distraction content according to the action of the obstructer I1. As a result, the distraction device 20 can stop the obstruction action of the obstructer I1, for example, and the obstruction made by the obstructer is more effectively suppressed.

In addition, the generation unit 340 according to the present embodiment can generate the distraction-related information according to the approach of at least one of the obstructer I1 or the obstacle to the designated device 10. When the obstructer I1 approaches the designated device 10, it is considered that there is a high possibility that the obstructer I1 obstructs the operation of the designated device 10. In addition, it is considered that there is a high possibility that the operation of the designated device 10 is obstructed by the obstacle when the obstacle such as a ball kicked by the obstructer I1 is approaching the designated device 10. Therefore, since the generation unit 340 according to the present embodiment can generate the distraction-related information before the operation of the designated device 10 is obstructed by the obstructer or the obstacle, it is possible to suppress the obstruction of the operation of the designated device 10 in advance.

In addition, the generation unit 340 according to the present embodiment can generate the distraction-related information according to the contact of at least one of the obstructer and the obstacle with the designated device 10. In general, it is considered that there is a high possibility that the operation of the designated device 10 is obstructed when the obstructer or the obstacle comes into contact with the designated device 10. Therefore, the distraction device 20 according to the present embodiment can distract the obstructer when there is a high possibility that the operation of the designated device 10 is obstructed, such that a possibility of unnecessary distraction is reduced.

1.7. Supplementary Description

Here, the supplementary description of the first embodiment will be provided. In the first embodiment, a case where there is temporarily no person around the designated device 10 has been assumed. However, in a case where there is a person around the designated device 10 (for example, the mother of the obstructer I1), the distraction device 20 may perform the distraction in consideration of the person. For example, in a case where the degree of urgency is high, a speaker (the distraction device 20) near the mother may output a sound saying, "Mom, help me. I'm gonna be out of order." to present information for urging the surrounding person to take an action. On the other hand, in a case where there is a person around the designated device 10 and the degree of urgency is low, the server 30 does not have to designate the distraction device 20 and the distraction content. This is to prevent a child from learning the distraction content of the distraction device 20. Further, this is to prevent surrounding people from being affected, since there is a possibility that a person around the designated device 10 inhibits the obstruction made by the obstructer.

Furthermore, the generation unit 340 according to the present embodiment may randomly generate the distraction-related information. For example, the generation unit 340 can randomly designate the distraction device 20 that is to perform the distraction from among a plurality of distraction devices 20. In addition, the generation unit 340 may select a plurality of distraction contents of the distraction device 20 as candidates and randomly designate the distraction content from the plurality of candidates. This makes it difficult for the obstructer I1 to learn the distraction device 20 and the distraction content. As a result, even in a case where the information processing system 1 according to the present embodiment is continuously used, the effect of inhibiting the obstruction made by the obstructer I1 is less likely to decrease.

Furthermore, in the above-described embodiment, the generation unit 340 mainly generates the distraction-related information based on the attribute information such as the characteristic information of the obstructer. The present disclosure is not limited thereto, and the generation unit 340 may further generate the distraction-related information based on the distraction history. For example, the generation unit 340 may generate the distraction-related information based on the distraction content of the distraction device 20 and the action of the obstructer after the distraction is performed by the distraction device 20. Specifically, in a case where the obstructer does not stop the obstruction action after a certain distraction is performed, the generation unit 340 may cause the distraction device 20 to perform distraction whose content is different from that of the certain distraction. As a result, the obstruction action of the obstructer is more effectively suppressed.

2. Second Embodiment

In a second embodiment, a case where a work of carrying an article by a delivery robot that is a designated device 10 is obstructed by a plurality of children (obstructers) in an overseas public facility (for example, a shopping mall, a restaurant, a hospital, or the like) will be described. In addition, in the second embodiment, unlike the first embodiment, a description will be made under the assumption that individual recognition of each obstructer is not performed. Specifically, it is assumed that a server 30 does not store information regarding the ID and preference of each obstructer. Note that an information processing system according to the second embodiment has substantially the same configuration as the information processing system 1 according to the first embodiment.

Processing performed by an information processing system 1 according to the second embodiment will be described with reference to the flowchart illustrated in FIG. 10. Note that a description of substantially the same processing as that of the first embodiment will be omitted as appropriate.

First, processing of Steps S101 and S103 is performed, but the processing of Steps S101 and S103 according to the second embodiment is substantially the same as the processing of Steps S101 and S103 according to the first embodiment, and thus a description thereof is omitted here. Here, as described above, an operation of the designated device 10 is obstructed by a plurality of obstructers.

Next, in a case where it is determined that the operation of the designated device 10 is obstructed (Step S103: YES), a detection unit 134 detects various types of information based on the sensor information (Step S105). Here, since there are a plurality of obstructers obstructing the operation of the designated device 10, the detection unit 134 detects the characteristic information, the action information, and the like regarding the plurality of obstructers. The detection unit 134 may also detect the state information and the environment information. The detection unit 134 transmits the detection result to the communication unit 140.

Next, processing of Steps S107 and S109 is performed, but the processing of Steps S107 and S109 according to the second embodiment is substantially the same as the processing of Steps S107 and S109 according to the first embodiment, and thus a description thereof is omitted here.

Next, a generation unit 340 of the server 30 generates various types of information (Step S111). In the second embodiment, a DB 330 stores a distraction database 332 illustrated in FIG. 11. FIG. 11 illustrates the distraction database 332 according to the second embodiment. The generation unit 340 generates various types of information based on the distraction database 332. Note that the generation unit 340 may designate a plurality of distraction devices 20 and designate a distraction content corresponding to each distraction device 20.

For example, in a case where the obstructer obstructs the movement of the designated device 10, the generation unit 340 may generate the distraction-related information indicating that the distraction device 20 is a monitor positioned around the designated device 10 and the distraction content is reproducing the content. In addition, the generation unit 340 may generate the linked operation information for causing the designated device 10 to perform an operation for attracting the attention of the obstructer to the monitor. The operation may be an operation of attracting the attention to the monitor by, for example, an LED, a face orientation, dancing, or the like.

Furthermore, in a case where the obstructer kicks or beats the designated device 10, the generation unit 340 may use a drive projector, a directional speaker, or the like as the distraction device 20. At this time, the generation unit 340 may generate the distraction-related information indicating that the distraction content is presenting a character around the designated device 10, for example, on a wall or the ground. It is considered that by presenting the character around the designated device 10, the obstructer is guided to a position away from the designated device 10. Furthermore, at this time, the generation unit 340 may generate the linked operation information for causing the designated device 10 to temporarily stop the operation.

In addition, in a case where the obstructer pulls the arm of the designated device 10, the generation unit 340 may generate the distraction-related information indicating that the distraction device 20 is a directional speaker and the distraction content is warning with a sound. At this time, the generation unit 340 may generate the linked operation information such that the designated device 10 shines red or outputs a warning expression (for example, warning with a sound or the like).

In addition, in a case where the obstructer gets on the designated device 10, the generation unit 340 may generate the distraction-related information indicating that the distraction device 20 is a smartphone of a child in the vicinity of the distraction device 20, and the distraction content is warning on a screen. At this time, the generation unit 340 may generate the linked operation information such that the designated device 10 shines red or outputs a warning expression (for example, warning with a sound or the like).

Furthermore, in a case where the obstructer attempts to pick up an article (for example, a dish) carried by the designated device 10, the generation unit 340 may generate the distraction-related information indicating that the distraction device 20 is a security robot, and the distraction content is approaching the obstructer to warn the obstructer (for example, outputting a warning sound). Here, the security robot may be, for example, a robot that patrols a facility where the designated device 10 is present and keeps watch.

In a case where there are a plurality of obstructers as in the second embodiment, the generation unit 340 may set the distraction content to presenting a content in which all of the plurality of obstructers are interested. In addition, the generation unit 340 may cooperate with the plurality of distraction devices 20 (for example, monitors). In addition, the generation unit 340 may use a large monitor as the distraction device 20, divide the large monitor, and set the distraction content to presenting a content that is suitable for each age group of the obstructers. Furthermore, in a case where a voice is presented from the distraction device 20, the generation unit 340 may change the language of the presented voice according to the nationality of the obstructer. In a case where the obstructer is a child with an age (for example, higher grades of an elementary school or higher) having a certain degree of discriminating ability, the generation unit 340 may set the distraction content to outputting a warning voice saying, "The fine is ZZZ yen, and the warning has been issued for XX times. It is against the law. I will report it to the school".

Figure 12:
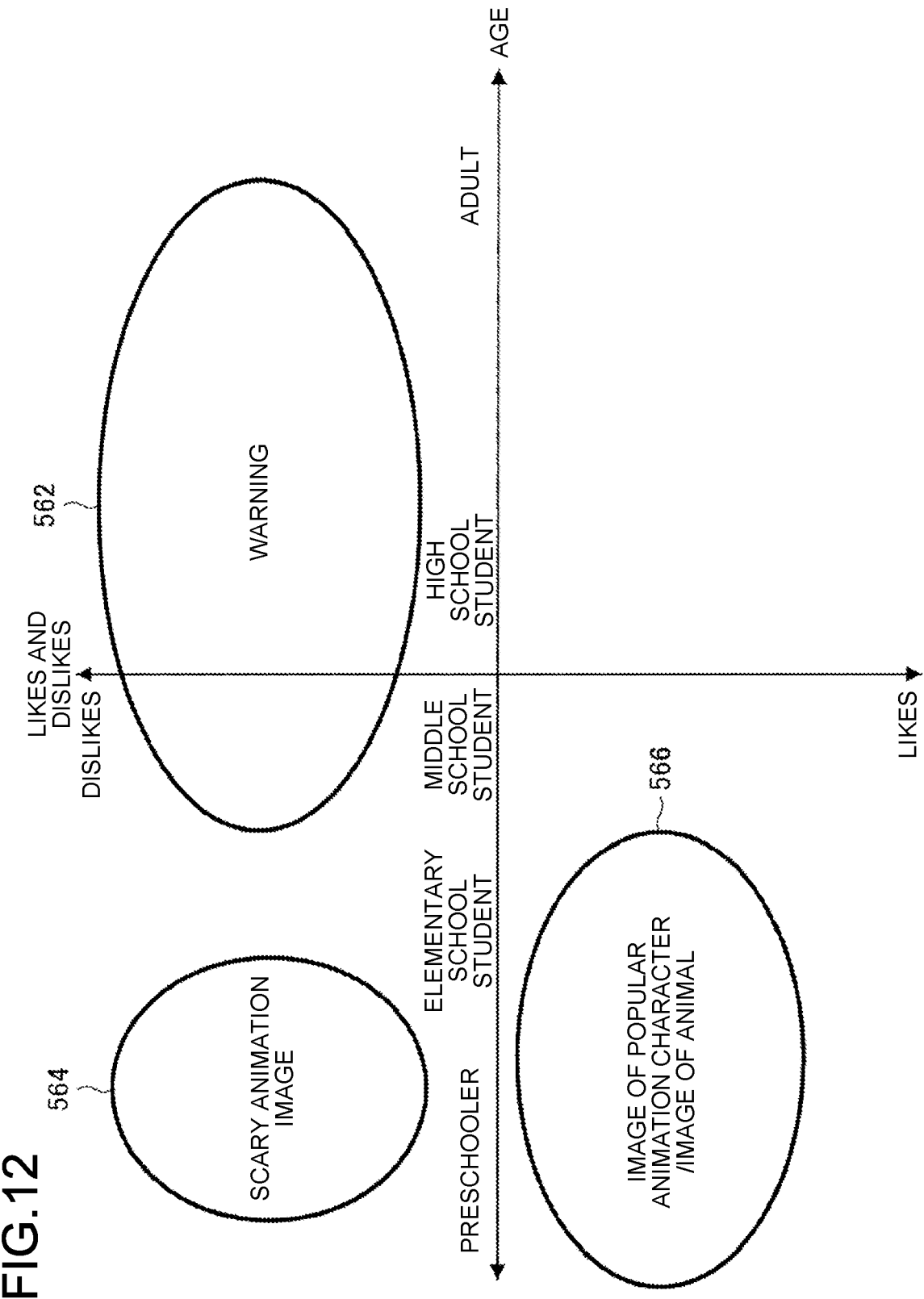
FIG. 12 is a diagram illustrating a relationship between the age of an obstructer and a distraction content.

That is, the generation unit 340 may decide the distraction content according to the age of the obstructer. Here, a relationship between the age of the obstructer and the distraction content will be described with reference to FIG. 12. FIG. 12 is a diagram illustrating the relationship between the age of the obstructer and the distraction content. In FIG. 12, a horizontal axis represents the age of the obstructer (from left to right: a preschooler, an elementary school student, a middle school student, a high school student, and an adult), a vertical axis represents likes and dislikes of the obstructer, and the distraction contents are illustrated in elliptical shapes.

For example, in a case where the age of the obstructer is in a range from the preschooler to the higher grades of the elementary school, the distraction content may be a content that the obstructer likes. For example, an image of a popular animation character, an image of an animal (for example, a dinosaur or the like), or the like may be displayed on the monitor. The image of the animal may be displayed using, for example, a laser projector. Accordingly, the attention of the obstructer such as a child is attracted to the monitor.

Furthermore, in a case where the age of the obstructer is in a range from the preschooler to the lower grades of the elementary school, the distraction content may be a content that the obstructer does not like. For example, an image of a scary animation may be displayed on a screen of a smartphone or the like. It is considered that the obstruction of the operation of the designated device 10 is suppressed by raising the fear of the obstructer as described above.

Further, in a case where the age of the obstructer is in a range from the higher grades of the elementary school to the adult, the distraction content may be a content that the obstructer dislikes. For example, an image or voice with contents such as "The repair cost is 1 million yen", "Unauthorized parking is prohibited. If found, a fine of 10,000 yen will be imposed", or "Capturing or recording a movie in a theater is a crime" may be presented.

When various types of information such as the distraction-related information are generated, a communication unit 310 transmits the distraction content to the designated distraction device 20 (Step S113). At this time, the communication unit 310 may transmit the distraction-related information corresponding to each distraction device 20 to the plurality of distraction devices 20. In this case, a communication unit 210 included in each distraction device 20 receives the distraction content.

Next, processing of Steps S115 to S119 is performed, but the processing of Steps S115 to S119 according to the second embodiment is substantially the same as the processing of Steps S115 to S119 according to the first embodiment, and thus a description thereof is omitted here. Note that, in Step S117, in a case where the distraction-related information is transmitted to the plurality of distraction devices 20, each of the distraction devices 20 that have received the distraction-related information performs the distraction.

Hereinabove, the information processing system 1 according to the second embodiment has been described with reference to FIG. 10. Here, effects obtained by the processing performed by the information processing system 1 according to the second embodiment in addition to the effects of the processing performed by the information processing system 1 according to the first embodiment will be described. With the information processing system 1 according to the second embodiment, even in a case where there are a plurality of obstructers, the obstruction of the operation of the designated device 10 can be suppressed. In addition, even in a case where the obstructer cannot be individually recognized, it is possible to generate the distraction-related information for distracting the obstructer based on the characteristic information acquired from the appearance of the obstructer or the like.

Furthermore, in the present embodiment, the generation unit 340 can generate the distraction-related information based on the characteristic information of the plurality of obstructers. For example, the generation unit 340 can generate the distraction-related information based on the characteristic information common to the plurality of obstructers. More specifically, in a case where the ages of the plurality of obstructers belong to a specific age group, the generation unit 340 can designate a content in which the age group is interested as the distraction content. Therefore, the information processing system 1 according to the present embodiment can effectively suppress the obstruction of the operation of the designated device 10 even in a case where there are a plurality of obstructers.

In the second embodiment, the situation in which the operation of the designated device 10 is obstructed has been mainly described. However, the present disclosure is not limited thereto. For example, in a case where there is a possibility that a group of children (obstructers) approaches the designated device 10, a peripheral device may serve as the distraction device 20 to distract the group of children in advance. Furthermore, the processing performed by the peripheral device may be performed at a timing when the children approach the designated device 10.

3. Third Embodiment

Figure 13:
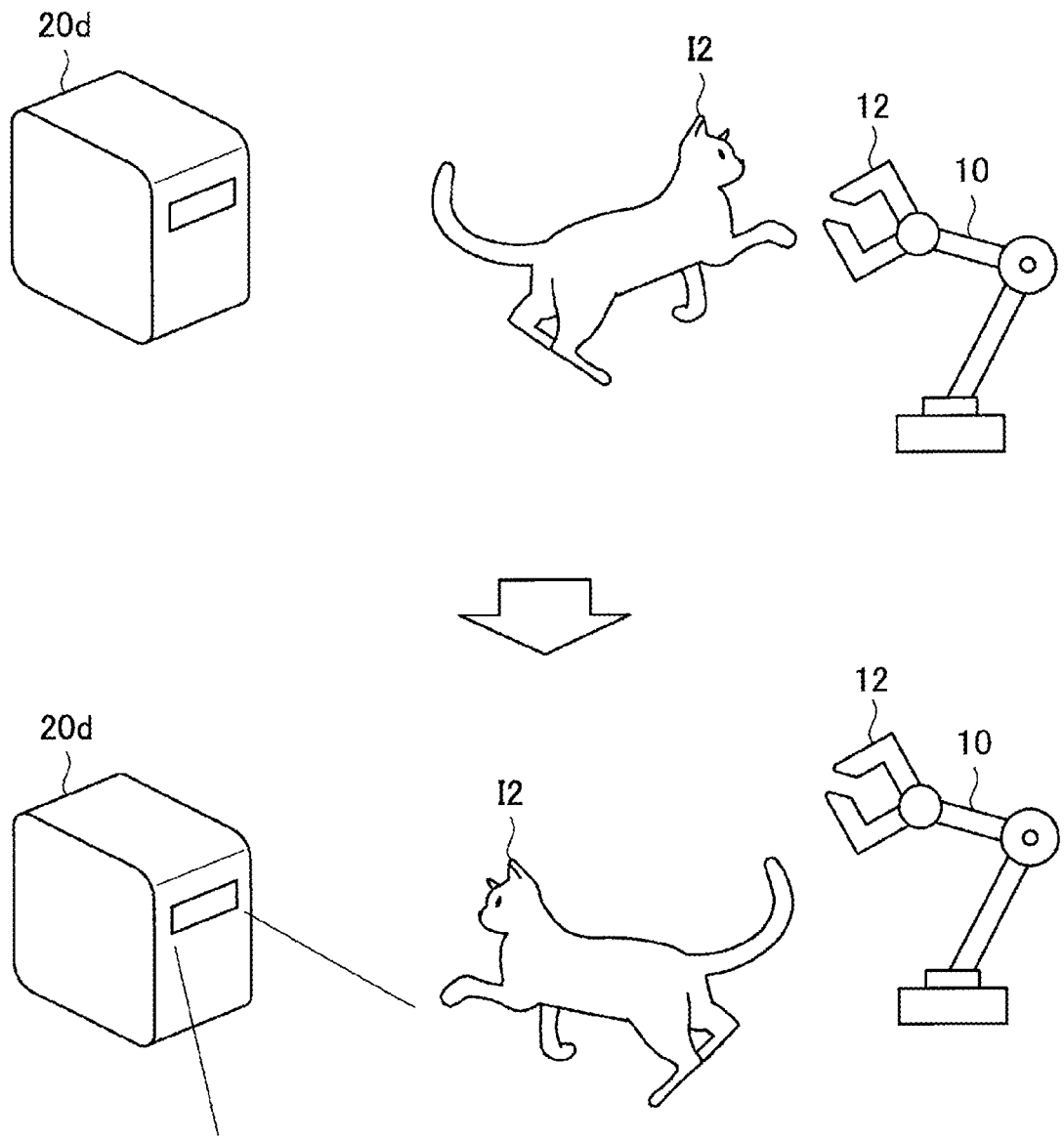
FIG. 13 is a diagram illustrating a situation according to a third embodiment.

A situation according to a third embodiment will be described with reference to FIG. 13. FIG. 13 is a diagram illustrating a situation according to the third embodiment. In the third embodiment, as illustrated in the upper part of FIG. 13, a cat (obstructer) I2 as a pet obstructs an operation of a robot (designated device) 10*d* in a home. Here, it is assumed that there is no person around the robot 10*d*. The robot 10*d* is a robot that can perform a work such as cooking, for example.

Processing in the third embodiment will be described. Note that an information processing system according to the third embodiment has substantially the same configuration as the information processing system 1 according to the first embodiment. However, a DB 330 of a server 30 according to the third embodiment stores a distraction database 333 illustrated in FIG. 14. FIG. 14 is a diagram illustrating the distraction database 333 according to the third embodiment. Hereinafter, processing performed by the information processing system 1 will be described with reference to the flowchart of FIG. 10 while referring to FIG. 14 as necessary.

First, a determination unit 132 determines the state of the robot 10*d* (Step S101). When the determination unit 132 determines that the operation of the robot 10*d* is obstructed (Step S103: YES), the processing proceeds to Step S105. When the determination unit 132 determines that the operation of the robot 10*d* is not obstructed (Step S103: NO), the processing returns to Step S101.

Next, processing of Steps S105 to S109 is performed, but since the processing of Steps S105 to S109 according to the third embodiment is substantially the same as the processing of Steps S105 to S109 according to the first embodiment, a description thereof is omitted here.

When an acquisition unit 320 acquires the detection result, a generation unit 340 of the server 30 generates various types of information (Step S111). More specifically, the generation unit 340 generates various types of information based on the acquired attribute information such as the characteristic information, the environment information, the state information, or the action information and the distraction database 333 illustrated in FIG. 14.

For example, in a case where the cat I2 touches an arm 12 of the robot 10*d*, the generation unit 340 may generate the distraction-related information indicating that a distraction device 20 is a projector, a movable laser pointer, a movable projector, or the like, and the distraction content is moving the position of a bright spot of light emitted from the distraction device 20. At this time, the generation unit 340 may generate the linked operation information for temporarily stopping the operation of the robot 10*d*.

Furthermore, in a case where the cat I2 approaches the arm 12 of the robot 10*d*, the generation unit 340 may generate the distraction-related information indicating that the distraction device 20 is a food server, and the distraction content is making a sound as if a feed comes out. At this time, the generation unit 340 may generate the linked operation information for temporarily stopping the operation of the designated device 10.

Furthermore, in a case where the cat I2 approaches the arm 12 of the robot 10*d*, the generation unit 340 may set generate the distraction-related information indicating that the distraction device 20 is a smell presentation device, and the distraction content is producing a favorite smell of the cat I2. At this time, the generation unit 340 may generate the linked operation information so that the robot 10*d* faces a distraction device 20*d*.

Next, processing of Steps S113 to S119 is performed, but since the processing of Steps S113 to S119 according to the third embodiment is substantially the same as the processing of Steps S113 to S119 according to the first embodiment, a description thereof is omitted here. When the distraction device 20*d* performs the distraction in Step S117, for example, as illustrated in the lower part of FIG. 13, the attention of the cat I2 is attracted to the distraction device 20*d*, such that the obstruction of the operation of the robot 10*d* is suppressed.

The processing performed by the information processing system 1 according to the third embodiment has been described above. As described above, with the information processing system 1 according to the present disclosure, even in a case where the obstructer is an animal other than a person (here, the cat I2), it is possible to suppress the obstruction of the operation of the designated device 10. Furthermore, it is a matter of course that, even when the obstructer is an animal, the effects described in the first and second embodiments can be obtained.

4. Modified Example

Here, a modified example of the above-described embodiments will be described. In the first to third embodiments, the distraction device 20 and the distraction content are designated through the processing performed by the server 30. In the modified example, the distraction device 20 and the distraction content are designated based on the processing performed by the server 30 and an operation performed by the operator.

4.1. Configuration of Information Processing System

Figure 15:
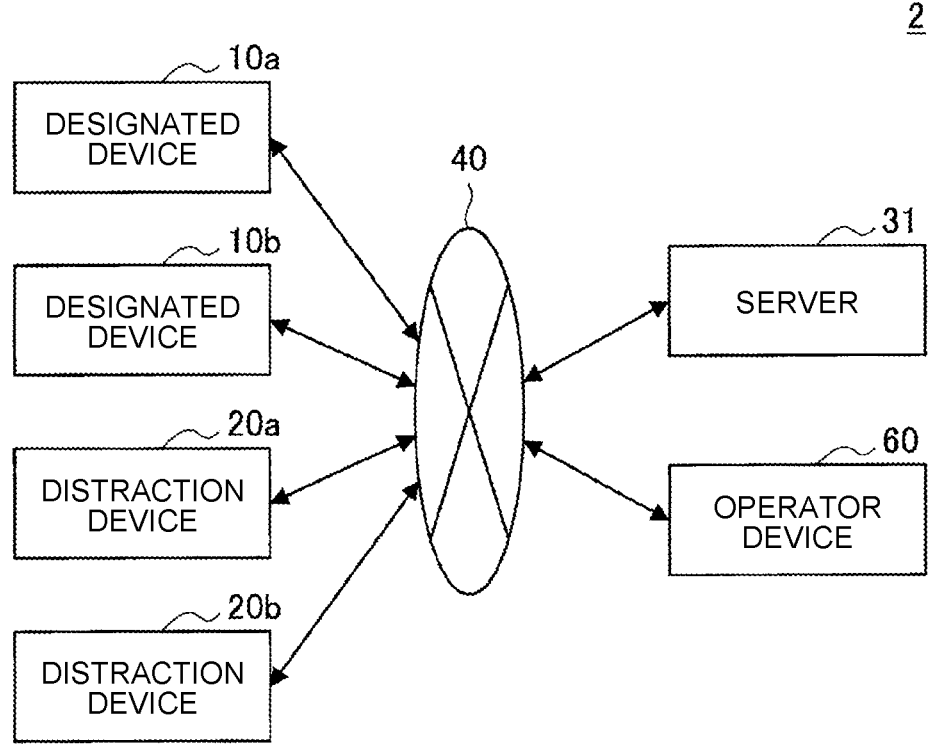
FIG. 15 is a diagram illustrating a configuration of an information processing system according to a modified example.

A configuration of an information processing system 2 according to the modified example will be described with reference to FIG. 15. FIG. 15 is a diagram illustrating the configuration of the information processing system 2 according to the modified example. Here, differences from the information processing system 1 illustrated in FIG. 1 will be mainly described.

The information processing system 2 according to the modified example includes designated devices 10*a* and 10*b* and distraction devices 20*a* and 20*b*, similarly to the information processing system 1 illustrated in FIG. 1. Furthermore, the information processing system 2 according to the modified example includes a server 31 and an operator device 60. The designated devices 10*a* and 10*b*, the distraction devices 20a and 20b, the server 31, and the operator device 60 are connected to each other via a network 40. Note that the number of the designated devices 10 or the distraction devices 20 connected to the network 40 may be one or three or more.

The server 31 according to the modified example can generate candidates for the distraction-related information and transmit the candidates to the operator device 60. The operator device 60 outputs the transmitted candidates to the operator. The operator selects the distraction-related information to be actually used from the candidates, and the server 31 can cause the distraction device 20 to perform various types of distractions based on the selected distraction-related information. Hereinafter, configurations and functions of the server 31 and the operator device 60 according to the modified example will be described with reference to FIGS. 16 and 17.

4.2. Configuration of Server

Figure 16:
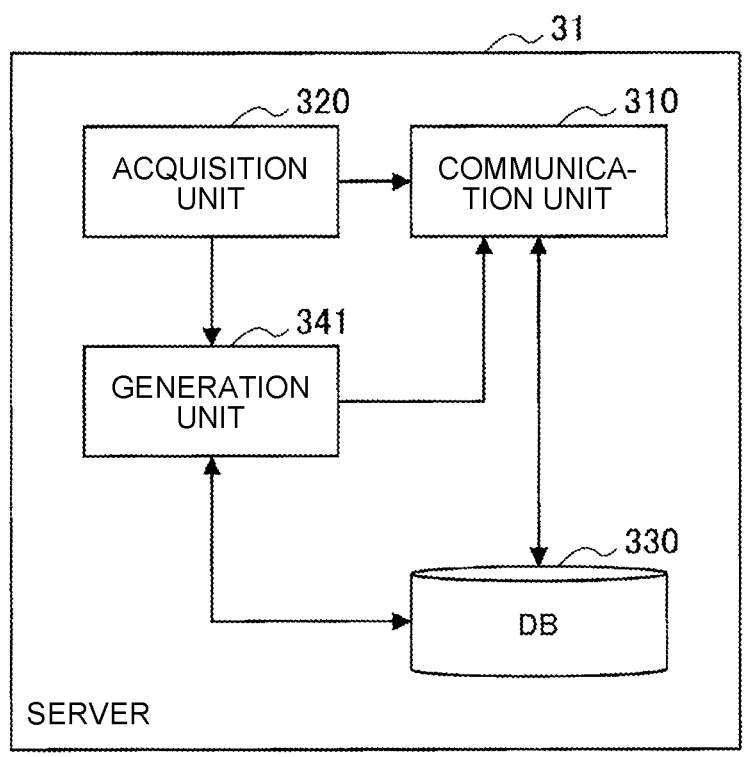
FIG. 16 is a functional block diagram illustrating a configuration of a server according to the modified example.

Next, the configuration and function of the server 31 according to the modified example will be described with reference to FIG. 16. FIG. 16 is a functional block diagram illustrating the configuration of the server 31 according to the modified example. As illustrated in FIG. 16, the server 31 according to the modified example includes a communication unit 310, an acquisition unit 320, a DB 330, and a generation unit 341. Here, a function of the generation unit 341 that is different from that of the generation unit 340 illustrated in FIG. 1 will be mainly described.

The generation unit 341 according to the modified example has a function of generating candidate information of the distraction-related information in addition to the function of generating the distraction-related information. More specifically, the generation unit 341 can generate the candidate information regarding the candidates for the distraction-related information based on the attribute information (the characteristic information, the environment information, the state information, the action information, or the like) transmitted from the designated device 10. That is, the generation unit 341 can decide candidates for the distraction device 20 and candidates for the distraction content. Note that the candidate information is assumed to be included as a type of distraction-related information. In addition, the candidate information may include information regarding candidates for the linked operation information. In addition, the generation unit 341 may generate information for requesting the operator to decide the distraction device 20 and the distraction content. The generation unit 341 transmits the generated various types of information to the communication unit 310.

4.3. Configuration of Operator Device

Figure 17:
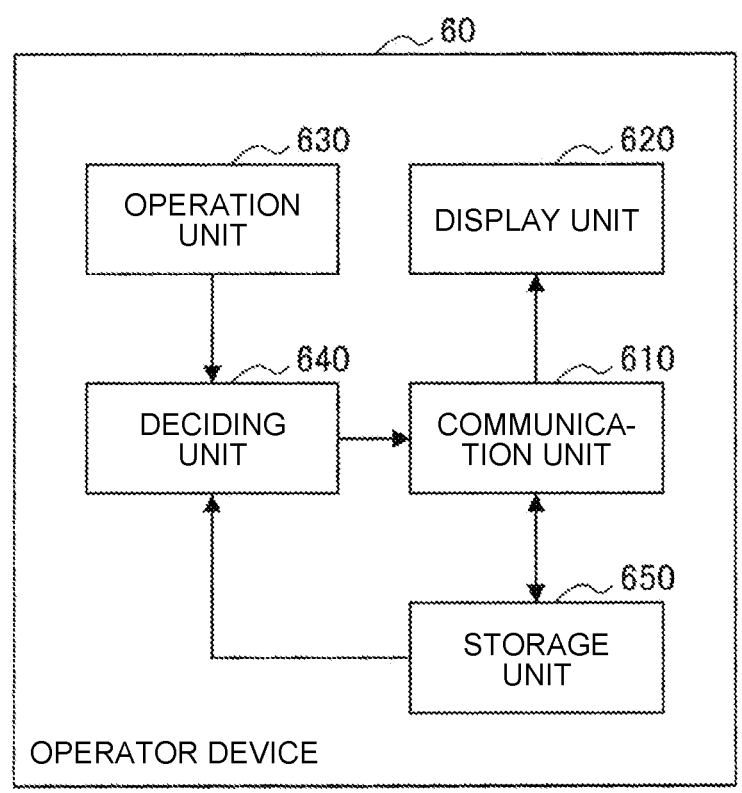
FIG. 17 is a functional block diagram illustrating a configuration of an operator device according to the modified example.

Next, the configuration and function of the operator device 60 will be described with reference to FIG. 17. FIG. 17 is a functional block diagram illustrating the configuration of the operator device 60 according to the modified example. As illustrated in FIG. 17, the operator device 60 includes a communication unit 610, a display unit 620, an operation unit 630, a deciding unit 640, and a storage unit 650.

The communication unit 610 has a function of transmitting and receiving various types of information. The communication unit 610 can receive, for example, the candidate information transmitted from the server 31. The communication unit 610 transmits the received various types of information to the display unit 620, the deciding unit 640, or the storage unit 650. Furthermore, the communication unit 610 can transmit various types of information such as the distraction-related information decided by the deciding unit 640 to the designated device 10, the distraction device 20, or the like.

The display unit 620 has a function of displaying an image. The display unit 620 may include various known display devices such as a display. For example, the display unit 620 may display an image indicating the contents of the candidates for the distraction-related information based on the candidate information.

The operation unit 630 has a function of receiving an operation of the operator and generating input information according to the operation. The operation unit 630 may be a device that receives various known operations through a mouse, a keyboard, a touch panel, or the like. The operation unit 630 transmits the input information to the deciding unit 640.

The deciding unit 640 has a function of deciding various types of information. More specifically, the deciding unit 640 may decide the distraction-related information to be actually used based on the input information and the candidate information. Furthermore, the deciding unit 640 may decide the linked operation information to be actually used based on the input information input to the operation unit 630 and the candidate information as necessary. The deciding unit 640 transmits the decision result to the communication unit 610 and the storage unit 650.

The storage unit 650 has a function of storing various types of information. The storage unit 650 may store, for example, the candidate information received by the communication unit 610 or the decision result of the deciding unit 640. Various types of information stored in the storage unit 650 may be referred to by the communication unit 610 or the deciding unit 640 as necessary.

4.4. Processing Example

Figure 18:
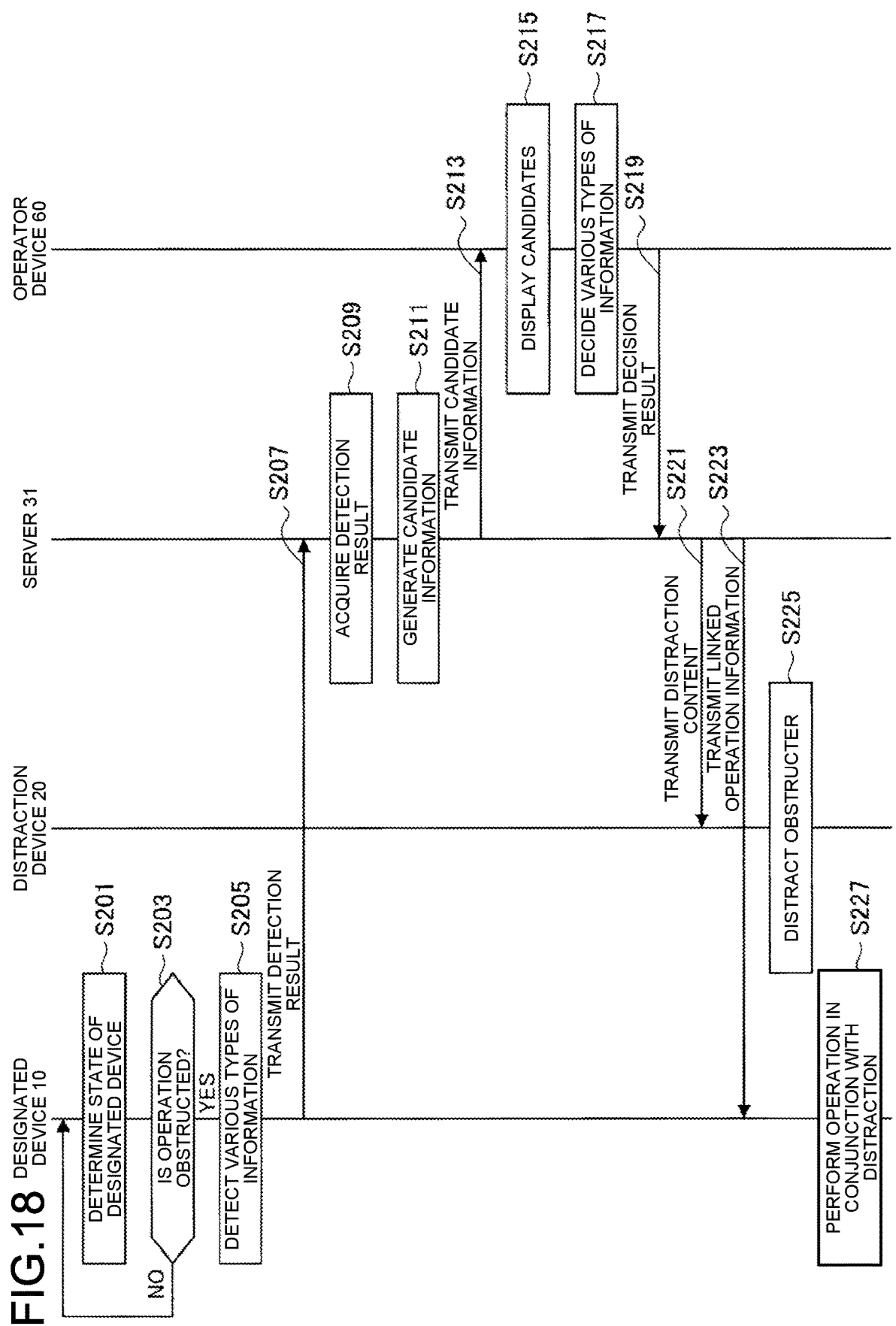
FIG. 18 is a flowchart illustrating processing performed by the information processing system according to the modified example.

Next, processing performed by the information processing system 2 according to the modified example will be described with reference to FIG. 18. FIG. 18 is a flowchart illustrating the processing performed by the information processing system 2 according to the modified example. Hereinafter, the processing performed by the information processing system 2 will be described with reference to the flowchart illustrated in FIG. 18.

First, processing of Steps S201 to S209 is performed, but the processing of Steps S201 to S209 according to the modified example is substantially the same as the processing of Steps S101 to S109 in the flowchart illustrated in FIG. 10, a description thereof is omitted here.

Next, the generation unit 341 of the server 31 generates the candidate information regarding the candidates for the distraction device 20 and the candidates for the distraction content (Step S211). Note that the generation unit 341 may generate a plurality of candidates for the distraction device 20 or may generate one candidate for the distraction device 20. In addition, the generation unit 341 may generate one or more candidates for the distraction content for one candidate for the distraction device 20.

Furthermore, the generation unit 341 may also generate candidates for the linked operation information. The generation unit 341 transmits the generated candidate information to the communication unit 310. The communication unit 310 transmits the candidate information to the operator device 60 (Step S213). The communication unit 610 of the operator device 60 receives the candidate information and transmits the candidate information to the display unit 620.

The display unit 620 displays the distraction device 20 and the candidate for the distraction content (Step S215). For example, the display unit 620 displays the candidate using a character, an image, or the like. As a result, the operator can recognize the distraction device 20 and the candidate for the distraction content.

Next, the deciding unit 640 decides various contents (Step S217). More specifically, the deciding unit 640 decides the distraction device 20 and the distraction content based on the operation of the operation unit 630 by the operator. For example, the deciding unit 640 may decide the distraction device 20 and the distraction content designated by the operator as the distraction device 20 and the distraction content to be actually used. The deciding unit 640 transmits the decision result to the communication unit 610. Note that the deciding unit 640 may also decide the linked operation information to be actually used based on the operation of the operator and transmit the linked operation information to the communication unit 610.

Next, the communication unit 610 transmits the decision result to the server 31 (Step S219). The communication unit 310 of the server 31 receives the decision result. Next, the communication unit 310 transmits the distraction content to the decided distraction device 20 (Step S221). Accordingly, the communication unit 210 of the distraction device 20 receives the distraction content. Next, the communication unit 310 of the server 31 transmits the linked operation information to the designated device 10 (Step S223). Accordingly, the communication unit 140 of the designated device 10 receives the linked operation information.

Next, the distraction device 20 distracts the obstructer (Step S225). More specifically, in the distraction device 20, a presentation unit 220 distracts the obstructer based on the decided distraction content. Next, the designated device 10 is operated in conjunction with the distraction performed by the distraction device 20 based on the decided linked operation information (Step S227).

The processing performed by the information processing system 2 according to the modified example has been described above with reference to FIG. 18. The server 31 according to the modified example generates the candidate information based on the attribute information. The operator can decide the distraction device 20 and the distraction content based on the candidate information, and can more appropriately attract the attention of the obstructer to the distraction device 20. As described above, the technology of the present disclosure can be applied not only to a case where the server 31 automatically designates the distraction device 20 and the distraction content, but also to a case where the distraction device 20 and the distraction content are designated by a person such as the operator.

In addition, the generation unit 341 according to the modified example can generate a plurality of candidates for the distraction-related information. Therefore, the operator can designate the distraction device 20 and the distraction content based on the plurality of pieces of distraction-related information. Therefore, with the information processing system 2 according to the present embodiment, the operator can easily designate the distraction device 20 and the distraction content. Furthermore, with the information processing system 2 according to the modified example, the effects described in the first to third embodiments can also be obtained.

5. Application Example

In the first to third embodiments and the modified example, the object of the technology of the present disclosure has been mainly described as suppressing the obstruction made by the obstructer in a situation where the operation of the designated device 10 is obstructed by the obstructer. However, the technology of the present disclosure is not limited thereto, and can be applied to other than robots. For example, the technology of the present disclosure can also be applied to a situation where a child comes into contact with a heating device, an electric fan, a knife, a medicine placed on a wash basin, or the like, or a child is in danger as described below. In an application example, a case of suppressing occurrence of a danger caused to a child in a situation where the child approaches a dangerous article in a home will be described.

5.1. Configuration of Information Processing System

Figure 19:
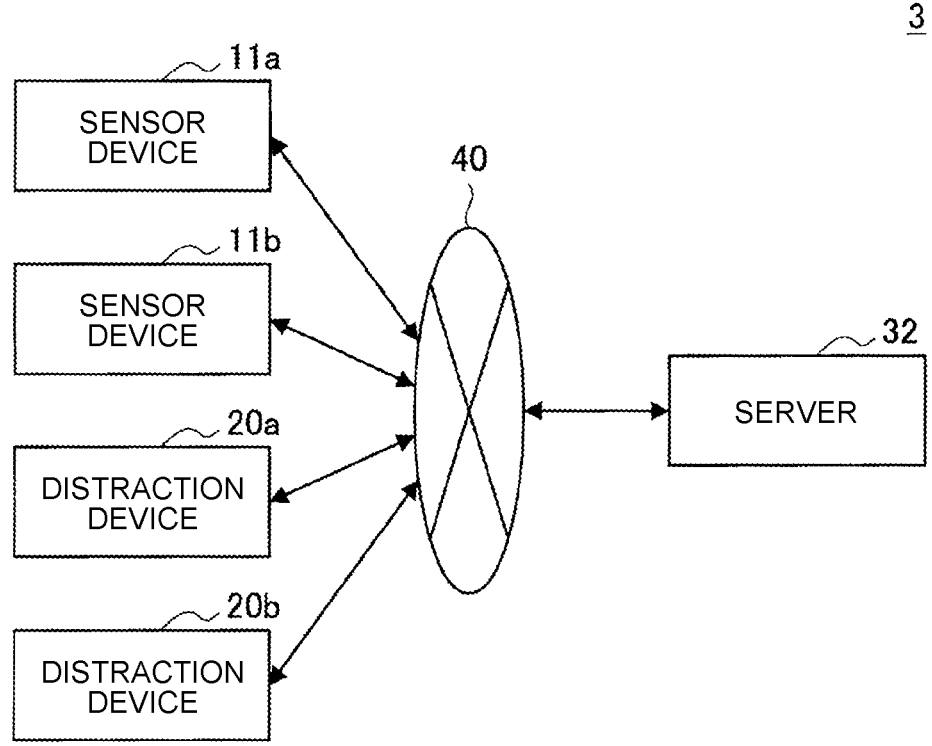
FIG. 19 is a diagram illustrating a configuration of an information processing system according to an application example.

A configuration of an information processing system 3 according to the application example will be described with reference to FIG. 19. FIG. 19 is a diagram illustrating the configuration of the information processing system 3 according to the application example. As illustrated in FIG. 19, the information processing system 3 according to the application example includes sensor devices 11a and 11b, distraction devices 20a and 20b, and a server 32. Therefore, the information processing system 3 according to the application example does not include the designated device 10. The sensor devices 11a and 11b, the distraction devices 20a and 20b, and the server 32 are connected to each other via a network 40.

A sensor device 11 has a function of acquiring various types of sensor information, detecting the attribute information as necessary, and transmitting the attribute information to the server 32. The sensor device 11 may include, for example, various sensor units described with reference to FIG. 3. The sensor device 11 can detect, for example, a danger caused to a child based on various types of sensor information acquired by the sensor unit. More specifically, for example, in a case where a child approaches or comes into contact with a dangerous article, the sensor device 11 can detect that the child is in danger.

Here, the dangerous article is an article that may endanger a child. An example of the dangerous article will be described with reference to FIG. 20. FIG. 20 is a view illustrating the dangerous article and a dangerous action that may be performed by a child due to the dangerous article. Examples of the dangerous article include a can of juice used as an ashtray. A child may accidentally perform a dangerous action of drinking the contents of the can. In the information processing system 3 according to the application example, the server 32 performs various types of processing to attract the attention of the child to the distraction device 20, such that the dangerous action can be suppressed.

Furthermore, the sensor device 11 can detect various types of information of the child based on the sensor information. For example, the sensor device 11 can detect the characteristic information, the action information, the environment information, or the like described with reference to FIG. 4. Furthermore, the sensor device 11 can transmit the detected characteristic information, action information, environment information, or the like to the server 32 via the network 40.

The configuration and the function of the distraction device 20 according to the application example are substantially the same as the configuration and the function of the distraction device 20 according to the above-described embodiments, and thus, a description thereof is omitted here.

5.2. Configuration of Server

Figure 21:
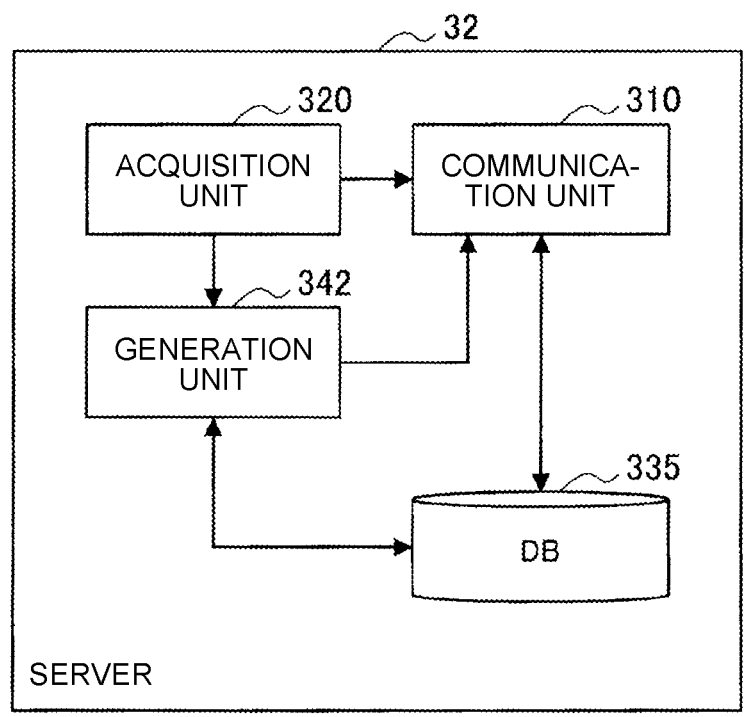
FIG. 21 is a functional block diagram illustrating a configuration of a server according to the application example.

Here, a configuration and a function of the server 32 according to the application example will be described with reference to FIG. 21. FIG. 21 is a functional block diagram illustrating the configuration of the server 32 according to the application example. The server 32 according to the application example has a function of acquiring the characteristic information of a user such as a child and generating the distraction-related information according to the characteristic information in a case where the user is in danger. The functions of the server 32 are implemented by cooperation of a communication unit 310, an acquisition unit 320, a DB 335, and a generation unit 342. Here, the functions of the DB 335 and the generation unit 342 will be mainly described.

The DB 335 includes a distraction database for the generation unit 342 to generate the distraction-related information. In the distraction database according to the application example, for example, an action of a child or the like approaching a dangerous article illustrated in FIG. 20, and the distraction device 20 and the distraction content associated with the action may be recorded. the distraction database is referred to by the generation unit 342 as necessary.

The generation unit 342 has a function of generating the distraction-related information based on various types of information such as the characteristic information and the distraction database stored in the DB 335. For example, when a child approaches a dangerous article, the generation unit 342 may generate the distraction-related information indicating that the distraction device 20 is a television, and the distraction content is outputting a favorite animation video of the child.

The communication unit 310 transmits the distraction content to the designated distraction device 20 based on the distraction-related information generated by the generation unit 342. As a result, the designated distraction device 20 performs the distraction, and the occurrence of a danger caused to the child is suppressed.

5.3. Processing Example

Figure 22:
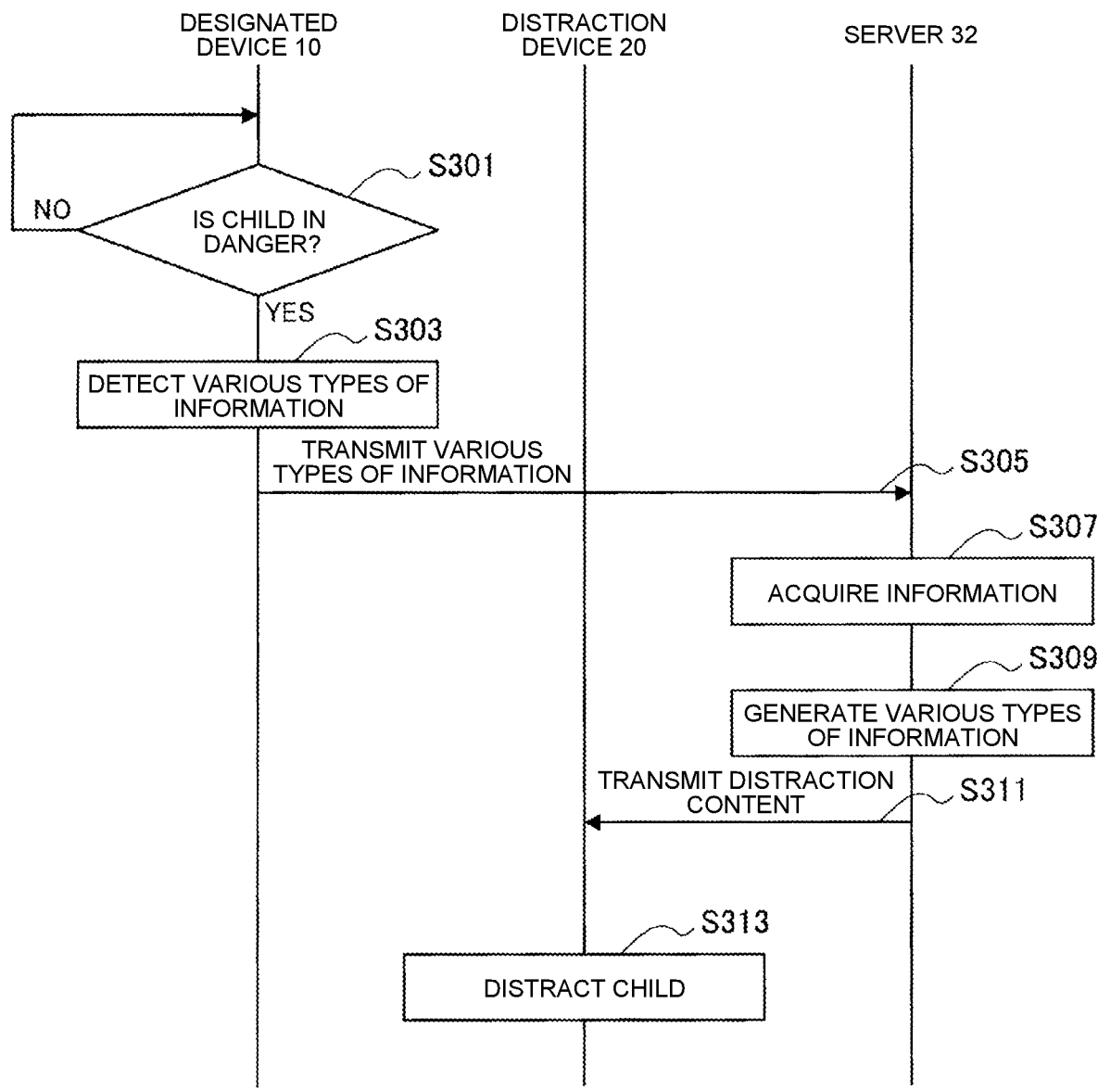
FIG. 22 is a flowchart illustrating processing performed by the information processing system according to the application example.

Next, processing performed by the information processing system 3 according to the application example will be described with reference to FIG. 22. FIG. 22 is a flowchart illustrating the processing performed by the information processing system 3 according to the application example. Hereinafter, the processing performed by the information processing system 3 according to the application example will be described with reference to FIG. 22.

First, the sensor device 11 determines whether or not a child is in danger (Step S301). For example, in a case where it is detected that the child approaches or comes into contact with a dangerous article, the sensor device 11 may determine that the child is in danger. In a case where it is determined that the child is in danger (Step S301: YES), the processing proceeds to Step S303. On the other hand, in a case where it is not determined that the child is in danger (Step S301: NO), the processing of Step S301 is performed again.

In a case of YES in Step S301 (that is, it is determined that the child is in danger), the sensor device 11 detects various types of information based on the sensor information (Step S303). More specifically, the sensor device 11 detects the characteristic information of the child who is in danger. Furthermore, the sensor device 11 may detect the environment information and the action information.

Next, the sensor device 11 transmits the detected various types of information to the server 32 (Step S305). More specifically, the sensor device 11 transmits information such as the detected characteristic information to the server 32. In addition to the sensor information, the sensor device 11 may transmit detected information such as the environment information to the server 32. The communication unit 310 of the server 32 receives the transmitted various types of information.

Next, the server 32 acquires the information transmitted from the sensor device 11 (Step S307). More specifically, the acquisition unit 320 acquires various types of information received by the communication unit 310.

Next, the generation unit 340 generates various types of information (Step S309). More specifically, the generation unit 340 generates the distraction-related information regarding the distraction device 20 and the distraction content based on various types of information including at least the characteristic information, and transmits the distraction-related information to the communication unit 310.

Next, the communication unit 310 transmits the distraction content to the distraction device 20 designated by the generation unit 340 (Step S311). A communication unit 210 of the distraction device 20 receives the transmitted distraction content and transmits the content to a presentation unit 220.

Next, the presentation unit 220 performs various types of presentation based on the transmitted distraction content (Step S313).

Hereinabove, the processing performed by the information processing system 3 according to the application example has been described. With such processing, for example, the attention of the child is attracted from the dangerous article to the distraction device 20 or the like, whereby the danger caused to the child is reduced. In addition, the parents and the like of the child do not always need to care about the action of the child.

Note that, in the above-described application example, when a child approaches or comes into contact with a dangerous article, the child is distracted. However, the present disclosure is not limited thereto, and a child may be distracted also in a case where the child approaches or comes into contact with an article other than a dangerous article. For example, in a case where a child approaches or comes into contact with an article (for example, foliage plants, various ornaments, posters, graffiti on walls, or the like) that is cherished by an adult (for example, the parents or the like of the child), the child may be distracted. That is, in a case where there is a possibility that the article is destroyed or damaged by a child, the child may be distracted. As a result, it is possible to prevent furnishing or the like that has been cherished from being broken or tampered with by a child or the like.

Note that, in the above-described application example, an example in which a child is distracted in a case where the child approaches a dangerous article or the like has been mainly described. However, the present disclosure is not limited thereto, and the technology of the above-described application example can also be applied to people in various ages other than children or various animals such as pets.

6. Hardware Configuration

Figure 23:
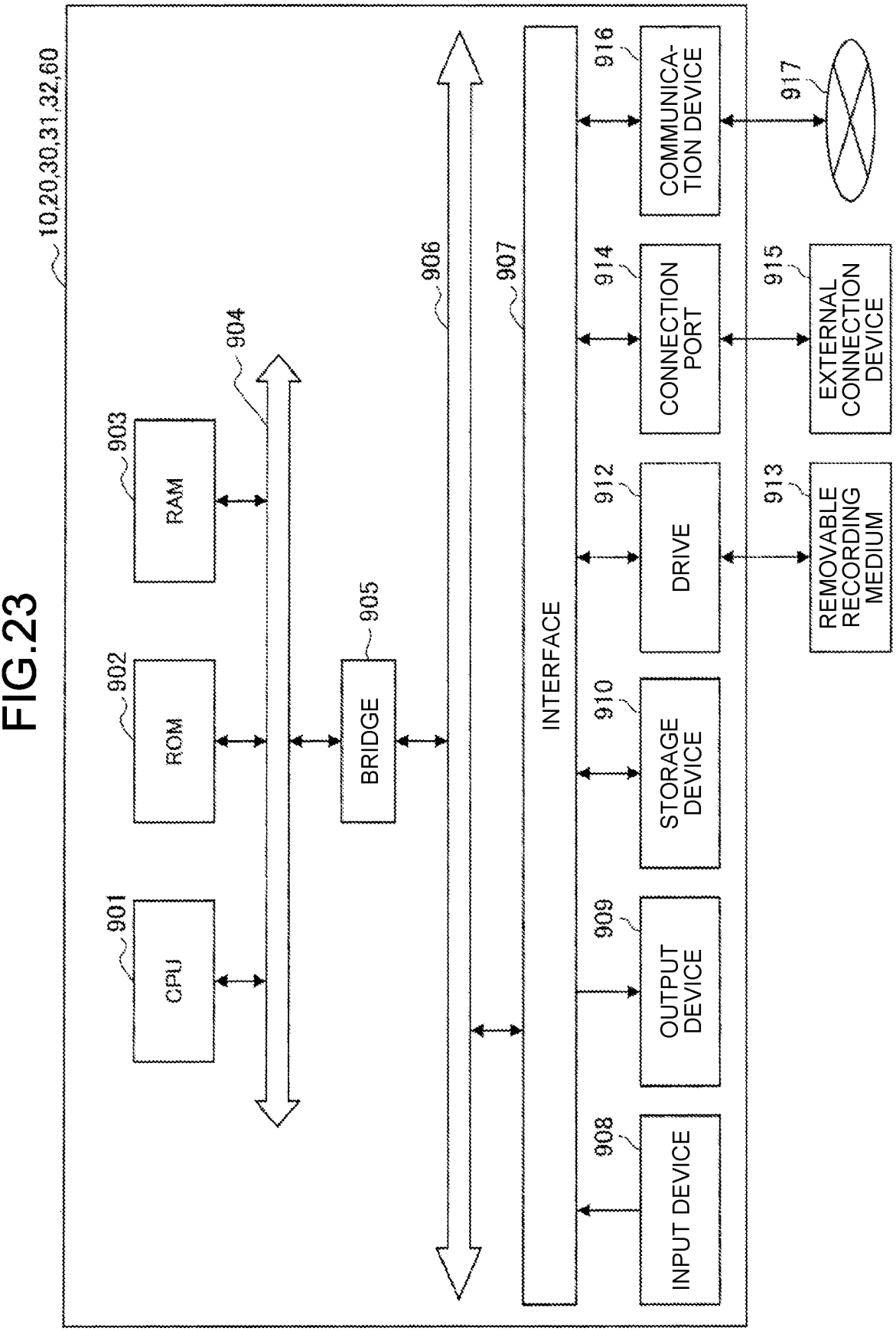
FIG. 23 is a functional block diagram illustrating a configuration example of a hardware configuration of a server or the like included in an information processing system according to an embodiment of the present disclosure.

Next, an example of a hardware configuration of the designated device 10, the distraction device 20, the servers 30, 31, or 32, or the operator device 60 (hereinafter, also referred to as the server 30 or the like) included in the information processing system 1, 2, or 3 according to the embodiments of the present disclosure, like the servers 30, 31, and 32 described above, will be described in detail with reference to FIG. 23. FIG. 23 is a functional block diagram illustrating a configuration example of the hardware configuration of the server 30 or the like included in the information processing system 1, 2, or 3 according to an embodiment of the present disclosure.

The server 30 or the like included in the information processing system 1, 2, or 3 according to the present embodiment mainly includes a CPU 901, a ROM 902, and a RAM 903. In addition, the server 30 or the like further includes a host bus 904, a bridge 905, an external bus 906, an interface 907, an input device 908, an output device 909, a storage device 910, a drive 912, a connection port 914, and a communication device 916.

The CPU 901 functions as an arithmetic processing device or a control device, and controls an overall operation in the server 30 or the like or a part thereof according to various programs recorded in the ROM 902, the RAM 903, the storage device 910, or a removable recording medium 913. The ROM 902 stores a program, a calculation parameter, and the like used by the CPU 901. The RAM 903 primarily stores the program used by the CPU 901, a parameter that changes as appropriate during execution of the program, and the like. These are connected to each other by the host bus 904 configured by using an internal bus such as a CPU bus. For example, the processing unit 130 and the control unit 150 illustrated in FIG. 2, the acquisition unit 320 and the generation unit 340 illustrated in FIG. 7, the acquisition unit 320 and the generation unit 341 illustrated in FIG. 16, the deciding unit 640 illustrated in FIG. 17, and the acquisition unit 320 and the generation unit 342 illustrated in FIG. 21 can be implemented by the CPU 901.

The host bus 904 is connected to the external bus 906 such as a peripheral component interconnect/interface (PCI) bus via the bridge 905. In addition, the input device 908, the output device 909, the storage device 910, the drive 912, the connection port 914, and the communication device 916 are connected to the external bus 906 via the interface 907.

The input device 908 is an operating means operated by the user, such as a mouse, a keyboard, a touch panel, a button, a switch, a lever, or a pedal. Further, the input device 908 may be, for example, a remote control means (so-called remote controller) using infrared rays or other radio waves, or may be an external connection device 915 such as a mobile phone or PDA that supports the operation of the server 30 or the like. In addition, the input device 908 is configured by using, for example, an input control circuit that generates an input signal based on information input by the user using the above operating means and outputs the input signal to the CPU 901. By operating the input device 908, the user of the server 30 or the like can input various data to the server 30 or the like and instruct a processing operation. For example, the operation unit 630 illustrated in FIG. 17 can be implemented by the input device 908.

The output device 909 is configured by using a device capable of visually or audibly notifying the user of acquired information. Examples of such a device include a display device such as a CRT display device, a liquid crystal display device, a plasma display device, or an EL display device or lamp, an audio output device such as a speaker and a headphone, or a printer device. The output device 909 outputs, for example, a result obtained by various processing performed by the server 30 or the like. Specifically, the display device displays the result obtained by various processing performed by the server 30 or the like as text or an image. On the other hand, the audio output device converts an audio signal composed of reproduced audio data, acoustic data, or the like into an analog signal and outputs the analog signal. For example, the output unit 160 illustrated in FIG. 2, the presentation unit 220 illustrated in FIG. 5, and the display unit 620 illustrated in FIG. 17 can be implemented by the output device 909.

The storage device 910 is a data storage device configured as an example of the storage unit of the server 30 or the like. The storage device 910 is configured by using, for example, a magnetic storage device such as a hard disk drive (HDD), a semiconductor storage device, an optical storage device, or a magneto-optical storage device. The storage device 910 stores programs executed by the CPU 901, various data, and the like. For example, the storage unit 120 illustrated in FIG. 2, the storage unit 230 illustrated in FIG. 5, the DB 330 illustrated in FIG. 7, the DB 330 illustrated in FIG. 16, the storage unit 650 illustrated in FIG. 17, and the DB 335 illustrated in FIG. 21 can be implemented by the storage device 910.

The drive 912 is a reader/writer for a recording medium, and is built in or externally attached to the server 30 or the like. The drive 912 reads information recorded in the removable recording medium 913 such as the mounted magnetic disk, optical disk, magneto-optical disk, or semiconductor memory, and outputs the information to the RAM 903. Further, the drive 912 can also write a record in the removable recording medium 913 such as the mounted magnetic disk, optical disk, magneto-optical disk, or semiconductor memory. Examples of the removable recording medium 913 include a DVD medium, an HD-DVD medium, and a Blu-ray (registered trademark) medium. Further, the removable recording medium 913 may be a compact flash (CF) (registered trademark), a flash memory, a secure digital (SD) memory card, or the like. Further, the removable recording medium 913 may be, for example, an integrated circuit (IC) card or electronic device that is equipped with a non-contact type IC chip.

The connection port 914 is a port for directly connecting to the server 30 or the like. Examples of the connection port 914 include a universal serial bus (USB) port, an IEEE1394 port, and a small computer system interface (SCSI) port. Other examples of the connection port 914 include an RS-232C port, an optical audio terminal, and a high-definition multimedia interface (HDMI) (registered trademark) port. By connecting the external connection device 915 to the connection port 914, the server 30 or the like acquires various data directly from the external connection device 915 and provides various data to the external connection device 915.

The communication device 916 is, for example, a communication interface configured by using a communication device or the like for connection to a communication network (network) 917. The communication device 916 is, for example, a communication card for a wired or wireless local area network (LAN), Bluetooth (registered trademark), wireless USB (WUSB), or the like. Further, the communication device 916 may be a router for optical communication, a router for asymmetric digital subscriber line (ADSL), a modem for various types of communication, or the like. The communication device 916 can transmit and receive a signal and the like to and from, for example, the Internet and another communication device in accordance with a predetermined protocol such as TCP/IP. Further, the communication network 917 connected to the communication device 916 is configured by using a network or the like connected in a wire or wireless manner, and may be, for example, the Internet, a home LAN, infrared communication, radio wave communication, or satellite communication.

Hereinabove, an example of the hardware configuration capable of implementing the functions of the server 30 or the like included in the information processing system 1, 2, or 3 according to the embodiments of the present disclosure has been described above. Each component described above may be configured by using a general-purpose member, or may be configured by hardware specialized for the function of each component. Therefore, it is possible to appropriately change the hardware configuration to be used according to the technical level at the time of implementing the present embodiment. Note that, although not illustrated in FIG. 23, various components corresponding to the server 30 and or like included in the information processing system 1, 2, or 3 are naturally included.

Note that it is possible to create a computer program for implementing each function of the server 30 or the like included in the information processing system 1, 2, or 3 according to the present embodiment as described above and install the computer program in a personal computer or the like. Further, it is possible to provide a computer-readable recording medium in which such a computer program is stored. Examples of the recording medium include a magnetic disk, an optical disk, a magneto-optical disk, and a flash memory. Further, the computer program described above may be distributed via, for example, a network without using the recording medium. Furthermore, the number of computers that execute the computer program is not particularly limited. For example, a plurality of computers (for example, a plurality of servers or the like) may execute the computer program in cooperation with each other.

7. Supplementary Description

As described above, the preferred embodiments of the present disclosure have been described in detail with reference to the accompanying drawings, but the technical scope of the present disclosure is not limited to such examples. It will be apparent to those skilled in the art to which the present disclosure pertains that various modified examples or alterations can be conceived within the scope of the technical idea described in the claims and it is naturally understood that these modified examples or alterations fall within the technical scope of the present disclosure.

For example, in the above-described embodiment, various types of sensor information are acquired by the sensor unit 110 included in the designated device 10. The present disclosure is not limited thereto, and the designated device 10 may acquire the sensor information in cooperation with a sensor arranged in the periphery. For example, it is assumed that sensors such as a sensor device of a monitoring camera or a game device are arranged around the designated device 10 over the indoor space in the future. Furthermore, in consideration of the IoT, it is conceivable that a sensor unit of the distraction device 20 is provided, and the sensor unit cooperates with the designated device 10. Such sensor information of the sensor unit may be transmitted to the servers 30 and 31, or may be transmitted to the servers 30 and 31 via the distraction device 20.

Furthermore, in the above-described embodiment, the processing performed by the information processing systems 1 and 2 in a case where the work (operation) of the designated device 10 is obstructed has been mainly described. However, the present disclosure is not limited thereto, and for example, the processing performed by the information processing systems 1 and 2 described above may be performed when the designated device 10 determines that the operation of the designated device 10 is likely to be obstructed. For example, the distraction illustrated in FIG. 8 may be performed at a timing when the obstructer approaches the designated device 10.

In the above-described embodiment, the servers 30 and 31 and the designated device 10 are independent from each other. However, the present disclosure is not limited thereto, and the servers 30 and 31 may have all the functions of the designated device 10. In this case, the servers 30 and 31 perform various types of transmission and reception with the distraction device 20, such that the distraction device 20 can distract the obstructer. Note that, as in the above-described embodiment, in a case where the servers 30 and 31 and the designated device 10 are independent of each other, the designated device 10 does not need to select the distraction device 20 or decide the distraction content, and thus, the burden of the operation of the designated device 10 is reduced.

In the above-described embodiment, a case where the operation of the designated device 10 is obstructed by the obstructer approaching and touching the designated device 10 has been described. However, the present disclosure is not limited thereto, and the technology of the present disclosure can also be applied to a case where the obstructer obstructs the operation of the designated device 10 without approaching the designated device 10. For example, the obstructer may throw a ball or the like toward the designated device 10 to obstruct the operation of the designated device 10. Even in this case, the designated device 10 can acquire the attribute information of the obstructer and transmit the attribute information to the server 30. The server 30 selects the distraction device 20 and decides the distraction content based on the received attribute information, and transmits the selection result and decision result to the distraction device 20. The distraction device 20 can distract the obstructer, thereby suppressing the obstruction of the operation of the designated device 10 made by the obstructer.

In the above-described embodiment, the designated device 10 detects the attribute information. However, the present disclosure is not limited thereto, and the servers 30 and 31 may detect the attribute information. In this case, the designated device 10 may transmit the sensor information or metadata of the sensor information to the servers 30 and 31. The servers 30 and 31 can detect the attribute information based on at least one of the sensor information or the metadata.

In addition, in the above-described embodiment, the generation unit 340 mainly generates the distraction-related information regarding one distraction device 20. However, the present disclosure is not limited thereto, and the generation unit 340 may generate the distraction-related information regarding a plurality of distraction devices 20. That is, the obstructer may be distracted by the plurality of distraction devices 20.

In the above-described embodiment, the generation units 340 and 341 generate the distraction-related information, the linked operation information, or the like based on the distraction database recorded in the DBs 330 and 335. However, the present disclosure is not limited thereto, and the generation units may generate the distraction-related information, the linked operation information, or the like based on various known machine learning algorithms.

Furthermore, in the above-described embodiment, an example in which various types of distractions are performed once by the distraction device 20 has been mainly described. However, the present disclosure is not limited thereto, and the distraction content may be decided according to the response of the obstructer. For example, in a case where the distraction using a sound does not affect the obstructer, the distraction may be performed by outputting a video from a monitor.

In addition, the steps illustrated in the flowcharts of the above-described embodiments include not only processing performed in chronological order according to the described order, but also processing performed in parallel or individually without necessarily being processed in chronological order. Furthermore, it goes without saying that the order of the steps performed in chronological order can also be appropriately changed in some cases.

In the above modified example, the operator device 60 presents the candidates for the distraction device 20 and the distraction content to the operator by displaying an image. However, the present disclosure is not limited thereto, and the operator device 60 may present the candidates to the operator by using a sound or the like.

Furthermore, the effects described in the present specification are merely illustrative or exemplary and are not restrictive. That is, the technology according to the present disclosure can exhibit, in addition to or in place of the above-described effects, other effects obvious to those skilled in the art from the description of the present specification.

Note that the following configurations also fall within the technical scope of the present disclosure.

(1)
An information processing device comprising:
an acquisition unit that acquires characteristic information of an obstructer that is at least one of a person or an animal that obstructs an operation of a designated device designated in advance; and
a generation unit that generates distraction-related information regarding a distraction device for distracting the obstructer and a distraction content of the distraction device according to the characteristic information.

(2)
The information processing device according to (1), wherein
the characteristic information includes information regarding a preference of the obstructer.

(3)
The information processing device according to (1) or (2), wherein
the characteristic information includes information regarding an age of the obstructer.

(4)
The information processing device according to any one of (1) to (3), wherein
the generation unit generates the distraction-related information according to an environment around the designated device.

(5)
The information processing device according to (4), wherein
the environment is information regarding a person other than the obstructer.

(6)
The information processing device according to any one of (1) to (5), wherein
the generation unit generates information for causing the designated device to be operated in conjunction with distraction performed by the distraction device.

(7)
The information processing device according to any one of (1) to (6), wherein
the generation unit randomly designates the distraction device and the distraction content.

(8)
The information processing device according to any one of (1) to (7), wherein
the acquisition unit acquires state information of the designated device, and
the generation unit generates the distraction-related information based on the state information.

(9)
The information processing device according to (8), wherein
the state information includes information regarding a state of an operation of the designated device.

(10)
The information processing device according to any one of (1) to (9), wherein
the acquisition unit acquires action information regarding an action of the obstructer, and
the generation unit generates the distraction-related information based on the action information.

(11)
The information processing device according to any one of (1) to (10), wherein
the generation unit generates the distraction-related information according to an approach of at least one of the obstructer or an obstacle to the designated device.

(12)
The information processing device according to any one of (1) to (11), wherein
the generation unit generates the distraction-related information according to a contact of at least one of the obstructer or an obstacle with the designated device.

(13)
The information processing device according to any one of (1) to (12), wherein
the generation unit generates the distraction-related information based on the distraction content of the distraction device and an action of the obstructer after the distraction is performed by the distraction device.

(14)
The information processing device according to any one of (1) to (13), wherein
the acquisition unit acquires the characteristic information of a plurality of the obstructers, and
the generation unit generates the distraction-related information based on the characteristic information of the plurality of obstructers.

(15)
The information processing device according to any one of (1) to (14), wherein
the generation unit generates a plurality of candidates for the distraction-related information.

(16)
An information processing method performed by a processor, the information processing method comprising:
acquiring characteristic information of an obstructer that is at least one of a person or an animal that obstructs an operation of a designated device designated in advance; and
generating distraction-related information regarding a distraction device for distracting the obstructer and a distraction content of the distraction device according to the characteristic information, the distraction device being different from the designated device.

(17)

A program for causing a computer to perform:
a function of acquiring characteristic information of an obstructer that is at least one of a person or an animal that obstructs an operation of a designated device designated in advance; and
a function of generating distraction-related information regarding a distraction device for distracting the obstructer and a distraction content of the distraction device according to the characteristic information, the distraction device being different from the designated device.

(18)

An information processing system comprising:
a designated device that is designated in advance;
an acquisition unit that acquires characteristic information of an obstructer that is at least one of a person or an animal that obstructs an operation of the designated device;
a generation unit that generates distraction-related information regarding a distraction device for distracting the obstructer and a distraction content of the distraction device according to the characteristic information, the distraction device being different from the designated device; and
the distraction device.

REFERENCE SIGNS LIST 1, 2, 3 INFORMATION PROCESSING SYSTEM
10 DESIGNATED DEVICE
110 SENSOR UNIT
130 PROCESSING UNIT
132 DETERMINATION UNIT
134 DETECTION UNIT
150 CONTROL UNIT
160 OUTPUT UNIT
170 DRIVE UNIT
11 SENSOR DEVICE
20 DISTRACTION DEVICE
220 PRESENTATION UNIT
30, 31 SERVER
310 COMMUNICATION UNIT
320 ACQUISITION UNIT
330, 335 DB
331, 332, 333 DISTRACTION DATABASE
340, 341, 342 GENERATION UNIT
60 OPERATOR DEVICE
620 DISPLAY UNIT
630 OPERATION UNIT
640 DECIDING UNIT

The invention claimed is:

1. An information processing device, comprising:
an acquisition unit that configured to acquire characteristic information of an obstructer, wherein
the obstructer is at least one of a first person or an animal that obstructs an operation of a designated device, and
the characteristic information includes information regarding a preference of the obstructer; and
a generation unit configured to generate, based on the characteristic information, distraction-related information regarding a distraction device and distraction content of the distraction device,
wherein the distraction device is for distraction of the obstructer.

2. The information processing device according to claim 1, wherein the characteristic information further includes information regarding an age of the obstructer.

3. The information processing device according to claim 1, wherein the generation unit is further configured to generate the distraction-related information based on environment information associated with environment around the designated device.

4. The information processing device according to claim 3, wherein the environment information is associated with a second person different from the obstructer.

5. The information processing device according to claim 1, wherein the generation unit is further configured to:
generate specific information; and
control, based on the generated specific information, the designated device in conjunction with the distraction.

6. The information processing device according to claim 1, wherein the generation unit is further configured to randomly designate the distraction device and the distraction content.

7. The information processing device according to claim 1, wherein
the acquisition unit is further configured to acquire state information of the designated device, and
the generation unit is further configured to generate the distraction-related information based on the state information.

8. The information processing device according to claim 7, wherein the state information includes information regarding a state of an operation of the designated device.

9. The information processing device according to claim 1, wherein
the acquisition unit is further configured to acquire action information regarding an action of the obstructer, and
the generation unit is further configured to generate the distraction-related information based on the action information.

10. The information processing device according to claim 1, wherein the generation unit is further configured to generate the distraction-related information based on an approach of at least one of the obstructer or an obstacle to the designated device.

11. The information processing device according to claim 1, wherein the generation unit is further configured to generate the distraction-related information based on a contact of at least one of the obstructer or an obstacle with the designated device.

12. The information processing device according to claim 1, wherein the generation unit is further configured to generate the distraction-related information based on:
the distraction content of the distraction device, and
an action of the obstructer after execution of the distraction by the distraction device.

13. The information processing device according to claim 1, wherein
the acquisition unit is further configured to acquire the characteristic information of a plurality of obstructers,
the plurality of obstructers includes the obstructer, and
the generation unit is further configured to generate the distraction-related information based on the characteristic information of the plurality of obstructers.

14. The information processing device according to claim 1, wherein the generation unit is further configured to generate a plurality of candidates for the distraction-related information.

15. An information processing method comprising:
acquiring characteristic information of an obstructer, wherein the obstructer is at least one of a person or an animal that obstructs an operation of a designated device, and the characteristic information includes information regarding a preference of the obstructer; and generating, based on the characteristic information, distraction-related information regarding distraction device and a distraction content of the distraction device, wherein the distraction device is for distraction of the obstructer, and the distraction device is different from the designated device.

16. A non-transitory computer-readable medium having stored thereon, computer-executable instructions which, when executed by a computer, cause the computer to execute operations, the operations comprising:

acquiring characteristic information of an obstructer, wherein the obstructer is at least one of a person or an animal that obstructs an operation of a designated device, and the characteristic information includes information regarding a preference of the obstructer; and generating, based on the characteristic information, distraction-related information regarding a distraction device and a distraction content of the distraction device, wherein the distraction device is for distraction of the obstructer, and the distraction device is different from the designated device.

17. An information processing system, comprising:

a distraction device configured to output information to distract an obstructer;

a designated device different from the distraction device;

an acquisition unit configured to acquire characteristic information of the obstructer, wherein the obstructer is at least one of a person or an animal that obstructs an operation of the designated device, and the characteristic information includes information regarding a preference of the obstructer; and a generation unit configured to generate, based on the characteristic information, distraction-related information regarding the distraction device and distraction content of the distraction device.

\* \* \* \* \*